June 5, 1951 — A. MACKMANN — 2,555,496
SPLINE ARBOR CHUCK
Filed March 17, 1947 — 10 Sheets-Sheet 1

INVENTOR.
Arthur Mackmann
BY
Louis Sheldon
Atty.

June 5, 1951 A. MACKMANN 2,555,496
SPLINE ARBOR CHUCK
Filed March 17, 1947 10 Sheets-Sheet 2

INVENTOR.
Arthur Mackmann
BY
Louis Sheldon
Atty.

June 5, 1951  A. MACKMANN  2,555,496
SPLINE ARBOR CHUCK

Filed March 17, 1947  10 Sheets-Sheet 3

INVENTOR.
Arthur Mackmann
BY
Louis Sheldon
Atty.

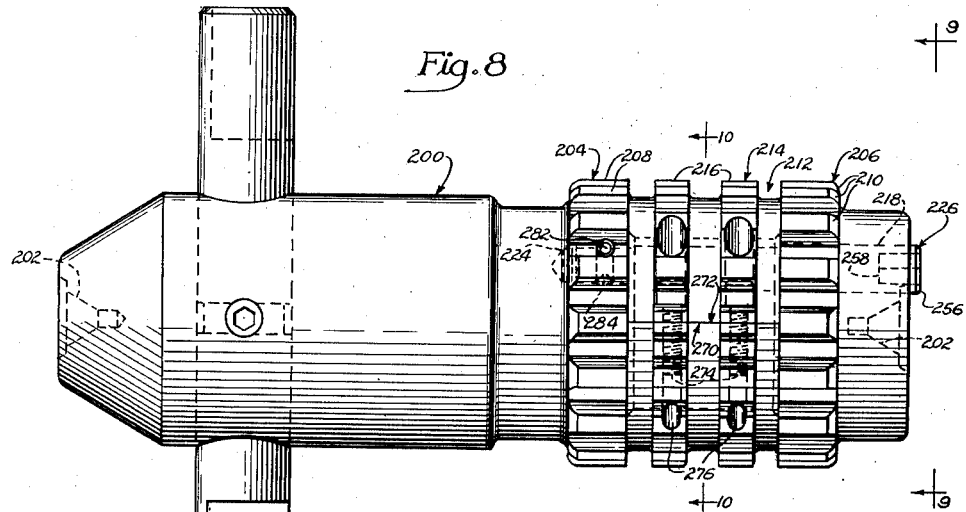
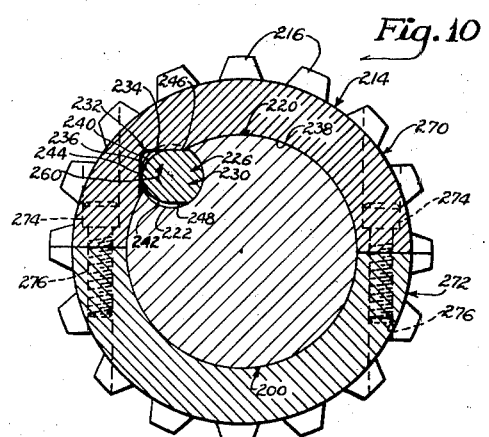
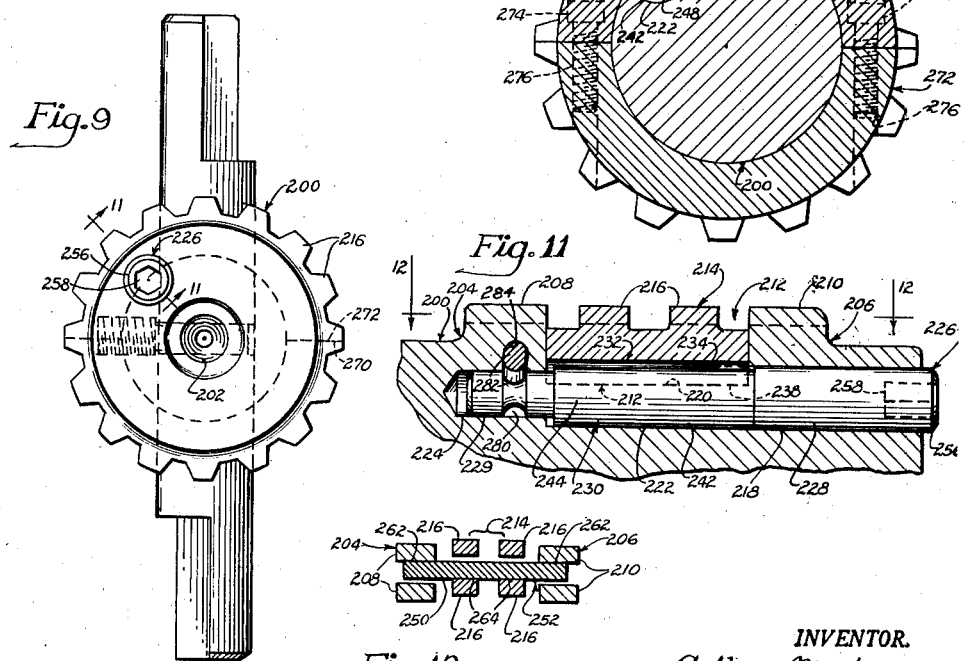

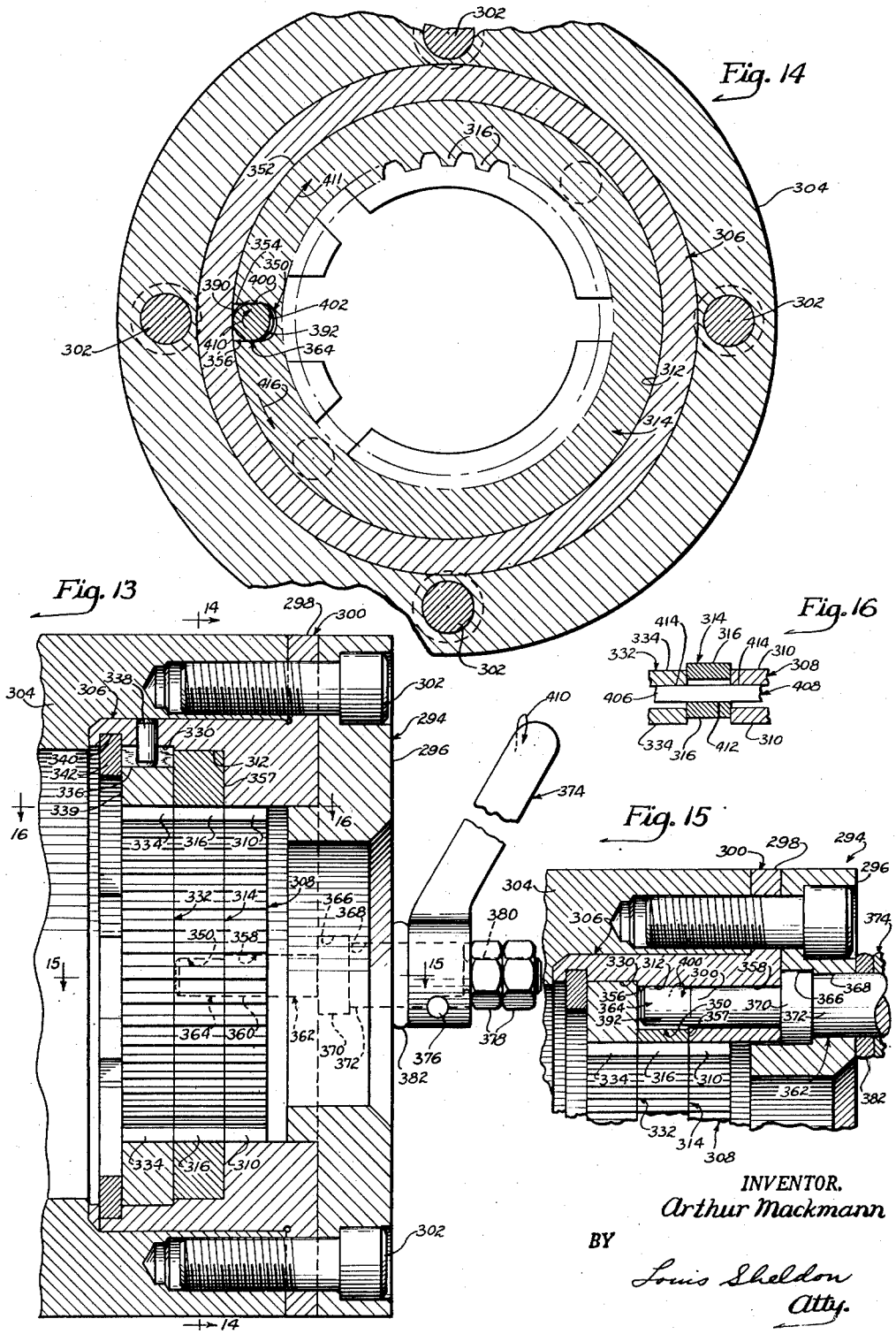

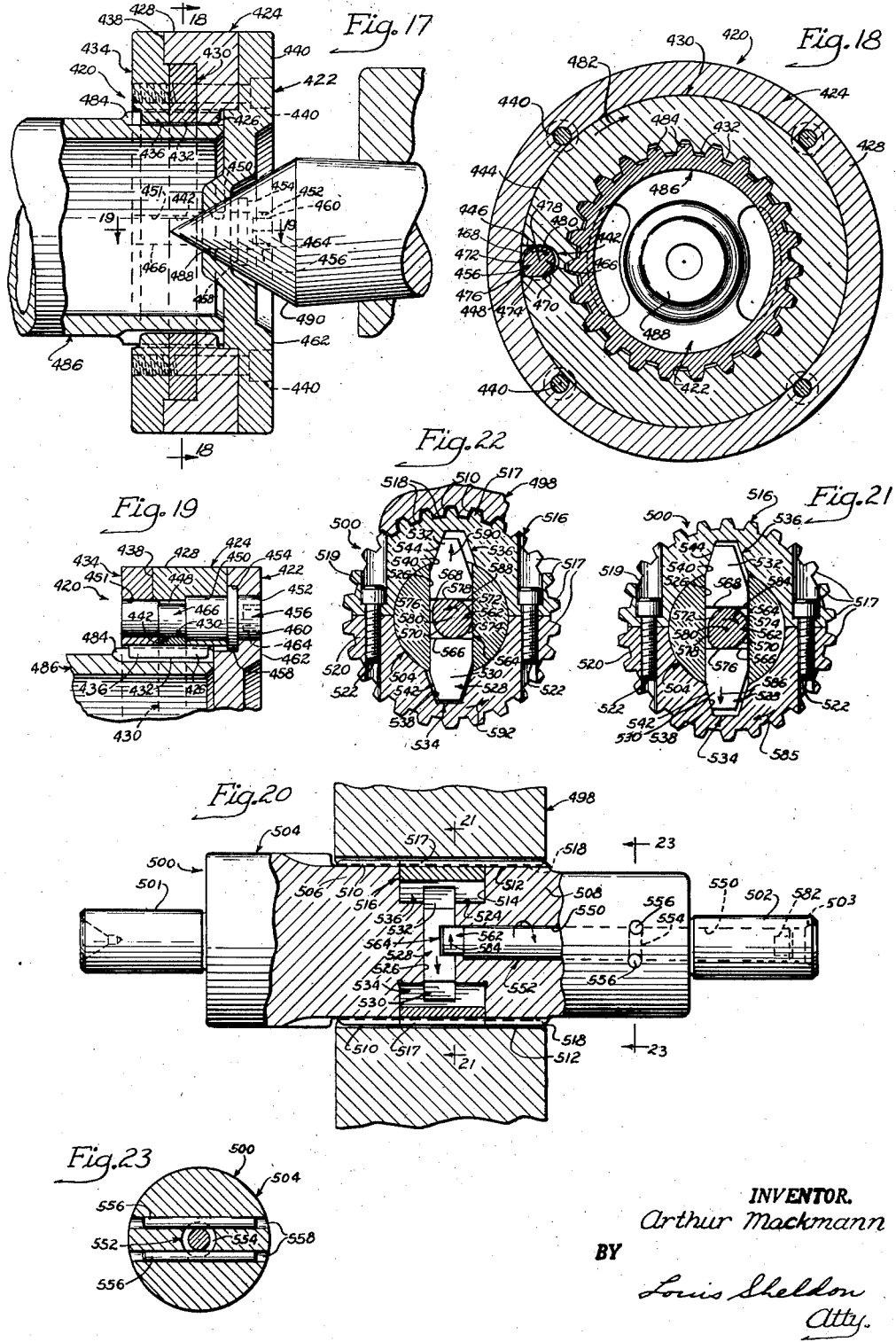

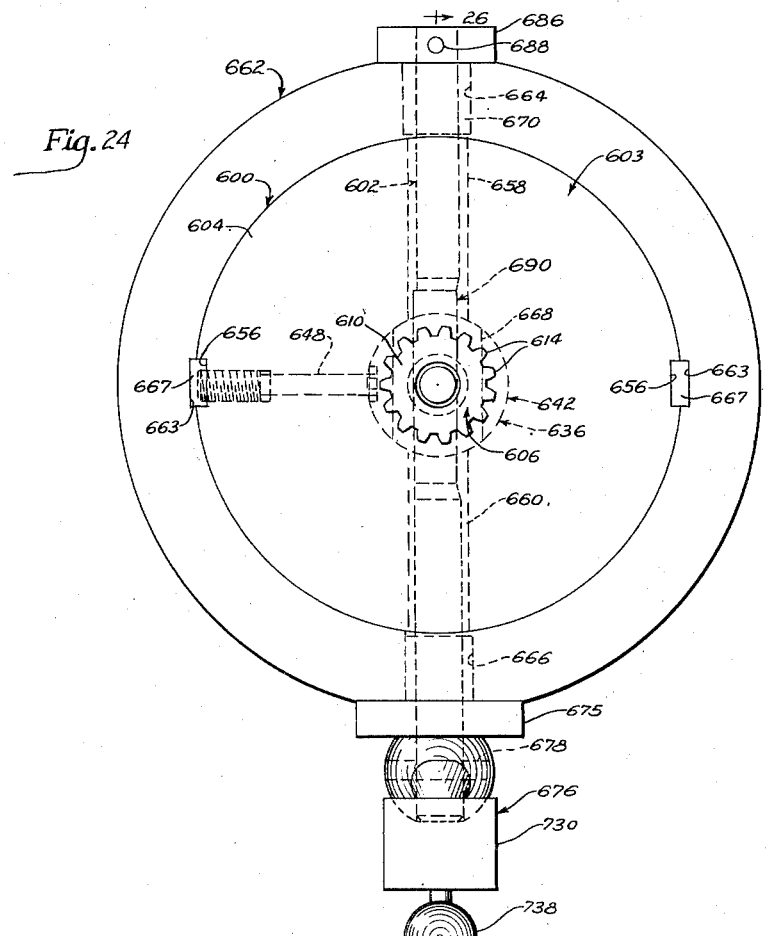
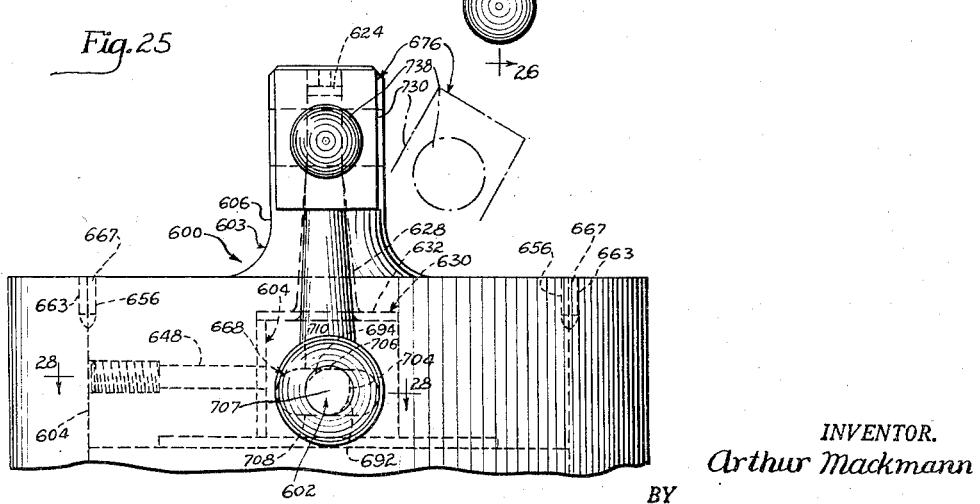

June 5, 1951  A. MACKMANN  2,555,496
SPLINE ARBOR CHUCK
Filed March 17, 1947  10 Sheets-Sheet 8
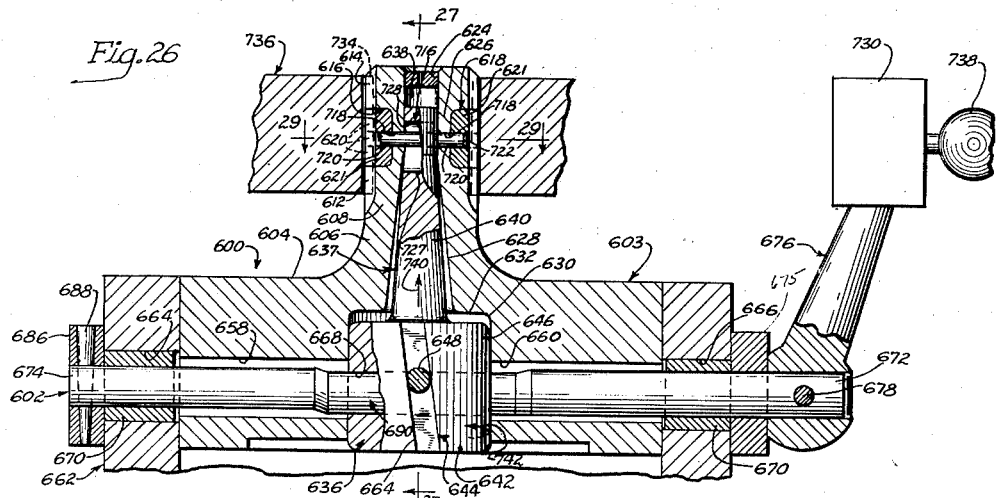
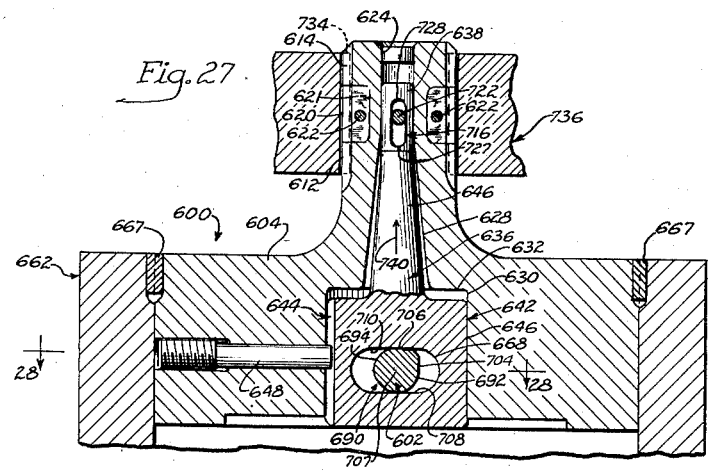
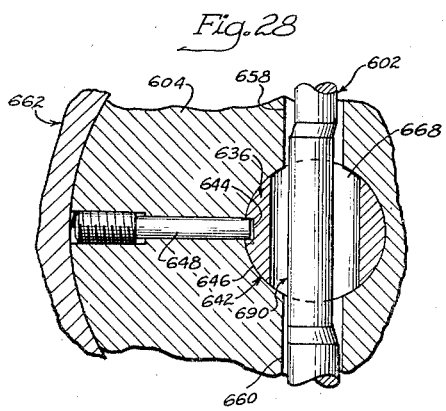
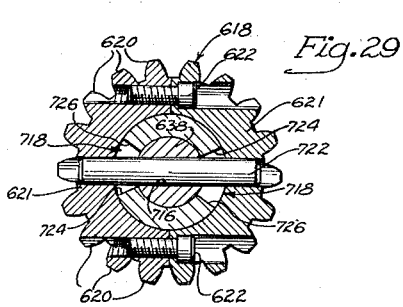
INVENTOR.
Arthur Mackmann
BY
Louis Sheldon
Atty.

June 5, 1951  A. MACKMANN  2,555,496
SPLINE ARBOR CHUCK
Filed March 17, 1947  10 Sheets-Sheet 9

INVENTOR.
Arthur Mackmann
BY
Louis Sheldon
Atty.

June 5, 1951 A. MACKMANN 2,555,496
SPLINE ARBOR CHUCK
Filed March 17, 1947 10 Sheets-Sheet 10
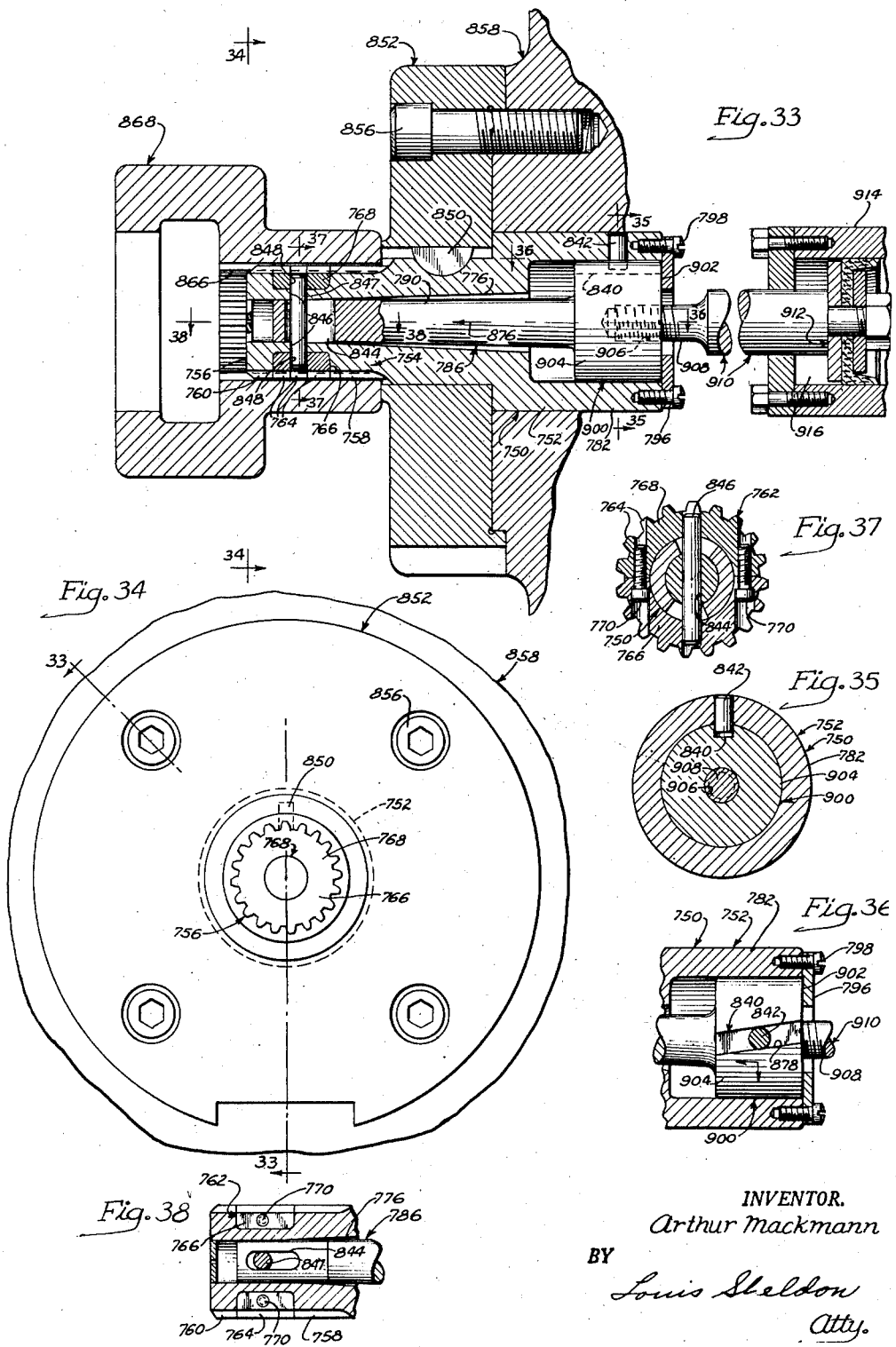
INVENTOR.
Arthur Mackmann
BY
Louis Sheldon
Atty.

Patented June 5, 1951

2,555,496

UNITED STATES PATENT OFFICE 2,555,496

SPLINE ARBOR CHUCK

Arthur Mackmann, Chicago, Ill.

Application March 17, 1947, Serial No. 735,182

36 Claims. (Cl. 279—1)

This invention relates to spline arbor chucks.

It is an object of my invention to provide an internal or external spline arbor chuck employing special and simple cam locking means for holding a workpiece with respectively internal or external spline teeth.

Another object is to provide a spline chuck having fixed and movable spline elements with means positively limiting the adjustment of the movable element.

An additional object is to provide a spline chuck with a single adjusting and locking element capable, in a single stroke, of movement selectively to locking or fully retracted position.

It is also an object of my invention to provide a spline chuck for a hollow workpiece with means for positively centering the workpiece for concentric machining.

An additional object is to provide a statically balanced adjustable spline chuck for accommodating a workpiece to be treated so as to have static and dynamic balance.

It is another object to provide spline chucks with locking means operable manually, hydraulically or pneumatically.

Further objects and advantages of the invention will appear as the description proceeds.

The invention will be better understood upon reference to the following description and accompanying drawings, in which:

Fig. 1 is a view, partly in section and partly in elevation, of an external directly-actuated manual spline chuck constructed in accordance with one form of my invention.

Figs. 2, 3 and 4 are views taken as indicated by the lines 2—2, 3—3 and 4—4, respectively, in Fig. 1.

Fig. 5 is a view, partly in section and partly in elevation, of a modified external directly-actuated manual spline chuck.

Figs. 6 and 7 are sectional views taken as indicated by the lines 6—6 and 7—7, respectively, in Fig. 5.

Fig. 8 is an elevational view of a still further modified form of external directly-actuated manual spline chuck.

Figs. 9 and 10 are views taken as indicated by the lines 9—9 and 10—10, respectively, in Fig. 8.

Fig. 11 is an enlarged fragmentary sectional view taken as indicated by the line 11—11 in Fig. 9.

Fig. 12 is a sectional view taken as indicated by the line 12—12 in Fig. 11 but with the adjustable spline ring shifted into clamping engagement with the workpiece.

Fig. 13 shows an internal directly-actuated manual spline chuck.

Figs. 14 and 15 are sectional views taken as indicated by the lines 14—14 and 15—15, respectively, in Fig. 13.

Fig. 16 is a sectional view taken as indicated by the line 16—16 in Fig. 13, but with the adjustable spline ring shifted to clamp the workpiece.

Fig. 17 is a view, partly in section and partly in elevation, of a modified internal directly-actuated manual spline chuck.

Figs. 18 and 19 are sectional views taken as indicated by the lines 18—18 and 19—19, respectively, in Fig. 17.

Fig. 20 shows an external semi-indirectly actuated manual spline chuck constructed so as to be in static balance.

Fig. 21 is a sectional view taken as indicated by the line 21—21 in Fig. 20.

Fig. 22 is a sectional view similar to Fig. 21 but with the adjustable spline ring shifted to clamp a workpiece.

Fig. 23 is a sectional view taken as indicated by the line 23—23 in Fig. 20.

Fig. 24 is a plan view of a modified external semi-indirectly actuated manual spline chuck.

Figs. 25 and 26 are views taken as indicated by the lines 25—25 and 26—26, respectively, in Fig. 24.

Fig. 27 is a sectional view taken as indicated by the line 27—27 in Fig. 26.

Fig. 28 is a sectional view taken as indicated by the line 28—28 in Fig. 25.

Fig. 29 is a sectional view taken as indicated by the line 29—29 in Fig. 26.

Figure 30:
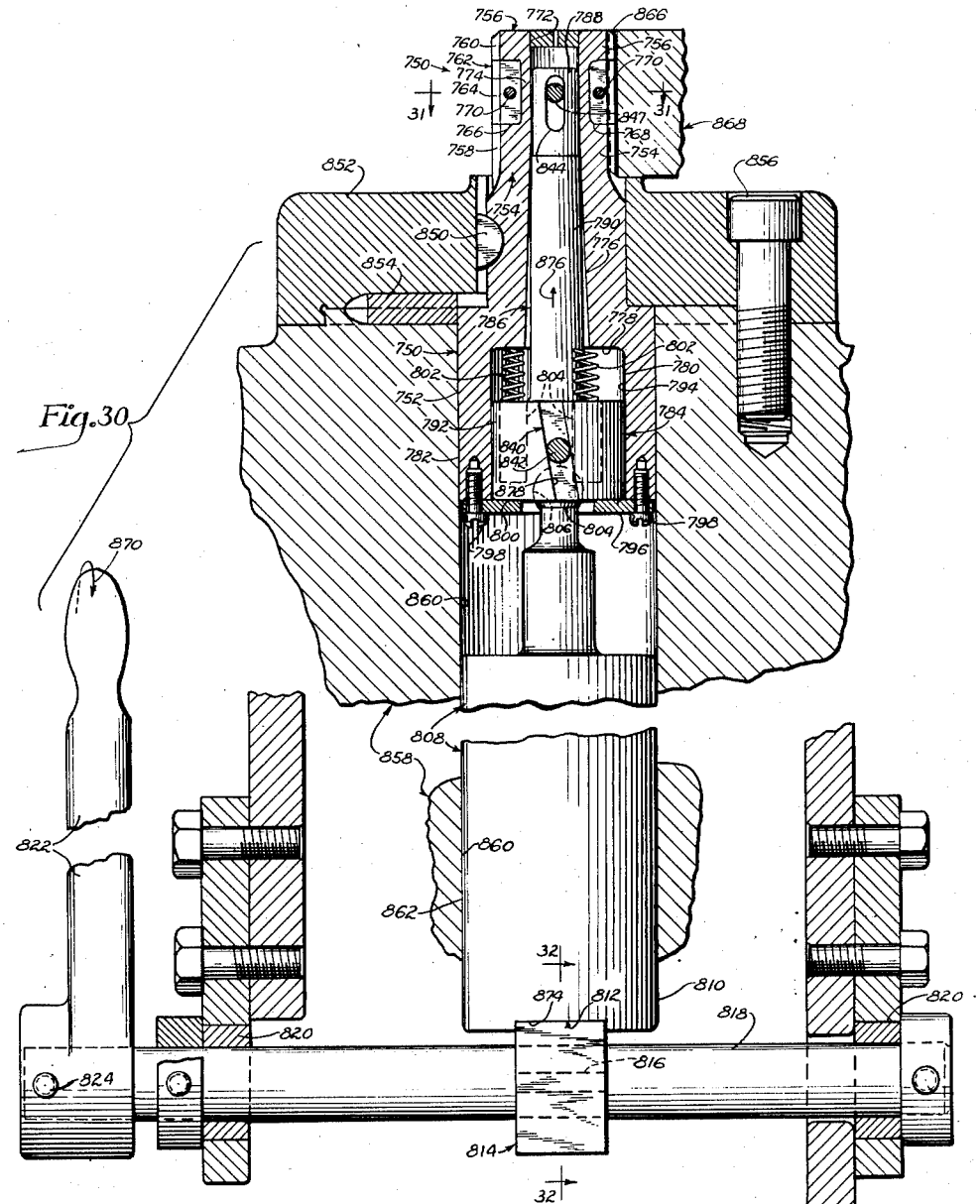

Fig. 30 is a fragmentary view, partly in section and partly in elevation, of a still further modified form of indirectly actuated spline chuck.

Figure 31:
Figure 32:
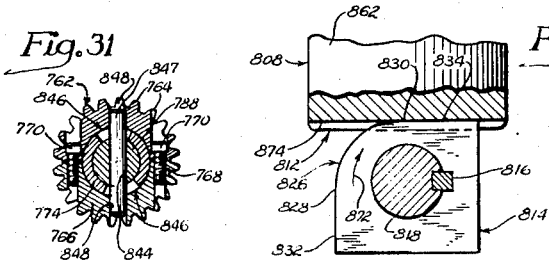

Figs. 31 and 32 are sectional views taken as indicated by the lines 31—31 and 32—32, respectively, in Fig. 30.

Fig. 33 is a fragmentary sectional view of an external spline chuck somewhat similar to those shown in Figs. 24 to 32 but operable by pneumatic or hydraulic means, and taken as indicated by the line 33—33 in Fig. 34.

Fig. 34 is an end elevational view taken as indicated by the line 34—34 in Fig. 33.

Figs. 35, 36, 37 and 38 are sectional views taken as indicated respectively by the lines 35—35, 36—36, 37—37 and 38—38 in Fig. 33.

Referring now to the drawings, wherein several embodiments of the invention are illustrated, and more particularly to the form appearing in Figs. 1 to 4, there is shown a back face plate 50 which may be altered to suit various installations and has a series of holes 51 whereby the same may be bolted as at 52 to a rotating part 53 of a lathe or other suitable machine tool. Integral with the plate 50 is an inner spline ring 54 having external spline teeth 55 and a reduced cylindrical central boss 56 extending outwardly therefrom and forming an internal bearing for an adjustable middle spline ring 57 having external spline teeth 58 adjustable into and out of register with the teeth 55, as will appear. An outer spline ring 59 is secured as by screws 60 to the boss 56 and has external spline teeth 61 at all times in register with the teeth 55, the middle spline ring 57 being in sliding face engagement with the relatively fixed inner and outer spline rings 54 and 59. All of the spline teeth are identical in pitch diameter, number and profile. The middle spline ring 57 has a slot 62 open at the inner periphery 63 of said ring and having parallel sides 64 and 65. A cylindrical cam rod 66 is disposed in all of the spline rings 54, 57 and 59 and has a flange 67 seated in a depression 68 of the outer ring 59 and engaging with the adjacent face 70 of the middle ring 57 so that said rod is capable of rotary movement only. The rod 66 has a preferably polygonal free extension 71 for the reception of a socket wrench (not shown), or may be formed with or securely receive a lever (not shown) for rotating the rod. The part 72 of the cam rod 66 within the middle spline ring 57 is cut identically away at opposite quadrants, providing curved surfaces 73, 74 starting at the periphery of the cylinder as shown at 75, 76 and terminating slightly radially inward of said periphery as shown at 77, 78, the quadrant at the minimum radial portions of said curved surfaces being identically cut away to provide adjacent tangential flat surfaces 79, 80 substantially 90° to each other. The curved cam surfaces 73, 74 are disposed for engagement with the two parallel sides 64, 65, respectively, of the slot 62 in the middle spline ring 57 and are so formed that the diametrical distance between all parts of said curved cam surfaces, through the axis 82 of the cam rod 66, is uniform and simultaneously slidably engageable with the respective sides of said slot, each cam surface, however, being of gradually increased radius from the flat surface 79, 80 contiguous thereto to the other end 75, 76 of said curved surface, as above noted.

When the cam rod 66 is in the relative position shown in full lines, with the flat surface 79 engaged with the side 64 of the slot 62, all of the teeth 55, 58 and 61 of the spline rings 54, 57 and 59, respectively, are in perfect register, as best seen in Fig. 4, so that the internal teeth 84 of a workpiece 86 to be machined may be readily slipped into splined relation to all of the spline teeth. Now if the cam rod 66 is rotated in the direction shown by the arrows 88, the adjustable spline ring 57 will be adjusted clockwise, as shown by the arrows 90, by reason of the engagement, with the right side 64 of the slot 62, of points on the cam surface 73 of progressively increasing radius (the other side 65 of the slot being at the same time engaged with points on the other cam surface 74 of progressively reduced radius). The parts are preferably dimensioned to allow for a maximum shift of .020″ at the periphery of the spline rings, although this amount may be increased or decreased, as desired. The maximum shift of the middle spline ring 57 can of course occur when the cam rod 66 has been rotated 90°, whereupon the flat surface 80 will be in full surface engagement with the left side 65 of the slot 62, and the radially outermost or high end 75 of the cam surface 73 will be engaged with the right side 64 of the slot. When, with the rod 66 at the limit just described, the rod is rotated counterclockwise, it can be turned only 90°, whereupon the flat surface 79 will engage the right side 64 of the slot 62, and then the teeth 58 of the middle spline ring 57 are in register with the teeth 55 and 61 of the relatively fixed spline rings 54 and 59, respectively.

Assuming now that the teeth 55, 58 and 61 of all of the spline rings 54, 57 and 59, respectively, are in perfect register and the internal spline teeth 84 of the workpiece 86 are in splined relation thereto, as best shown in full lines in Fig. 4, the workpiece teeth may be rigidly clamped by the spline rings pursuant to rotation of the cam rod 66 clockwise, i. e., in the direction of the arrows 88 (Figs. 1, 2 and 4) to the extent necessary to take up the slack or tolerance 92 between the workpiece teeth and the spline ring teeth, the cam surface 73 of the cam rod 66 becoming wedged against the side 64 of the slot 62, so that the rod will remain securely in any position to which it is adjusted. When the rod 66 is rotated counter-clockwise, the other cam surface 74, acting upon the left side 65 of the slot 62, cams said side to the left and thus shifts the middle spline ring 57 counter-clockwise to release the workpiece, in the same manner that the other curved cam surface 73 moved the right side 64 of the slot to the right as described above.

If desired, buttons or dowels 94, mounted in the outer spline ring 59, may serve as means against which the workpiece 86 may abut for positioning its internal teeth 84 in proper splined relation to the teeth 55, 58 and 61 of the three spline rings 54, 57 and 59, respectively. Each internal tooth 84 of the workpiece 86 is thus clamped at the end portions 95 thereof at one side and at the intermediate portion 96 thereof at the other side.

Figure 1:
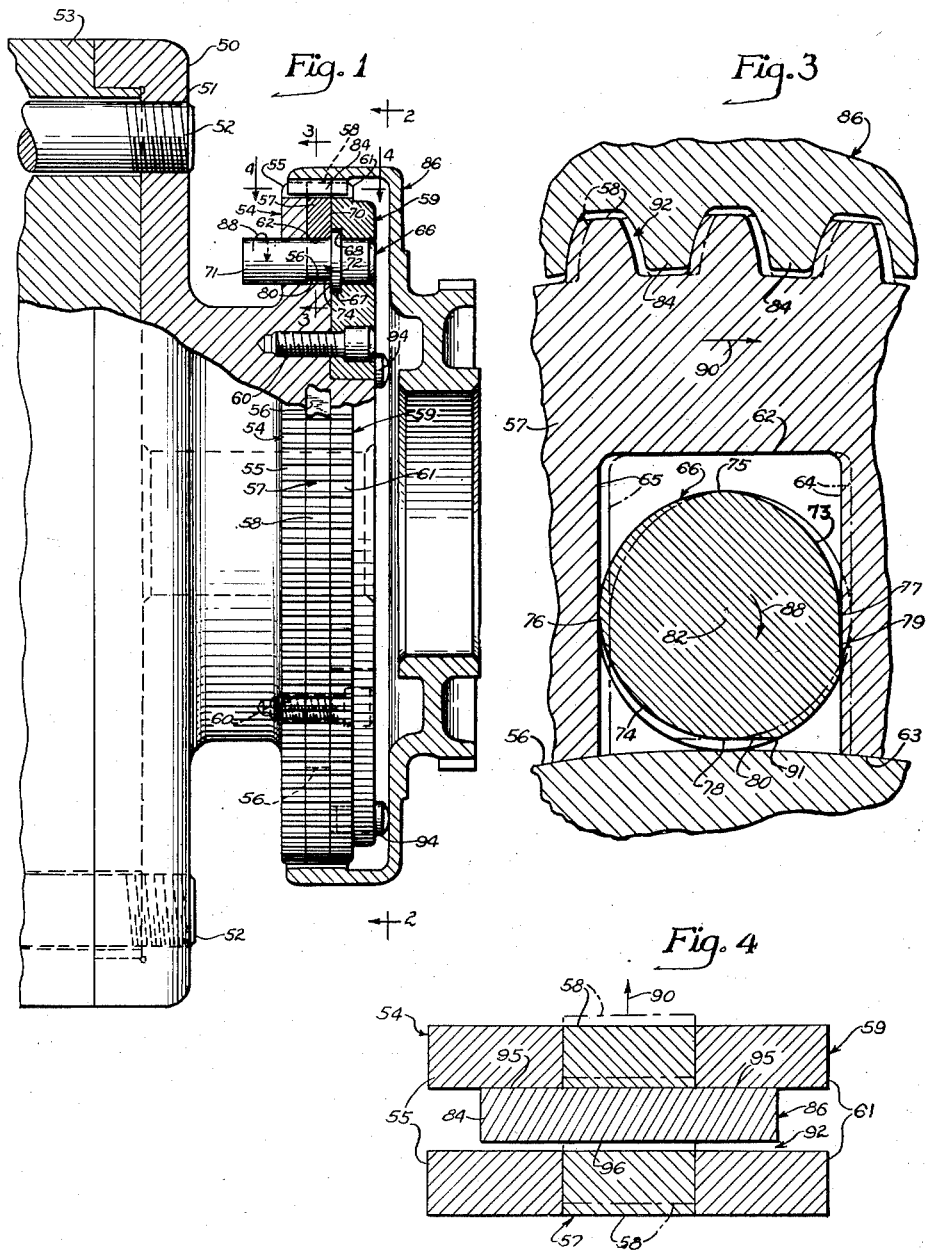
Figure 2:
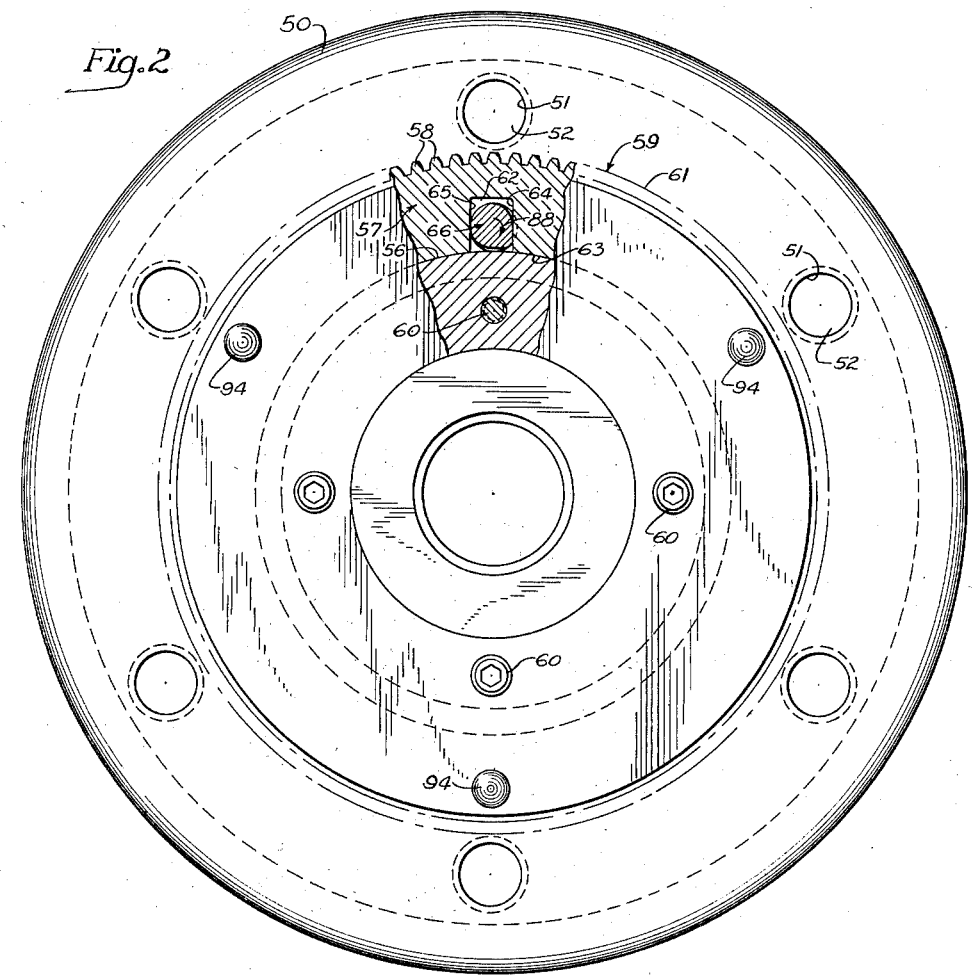
Figure 5:
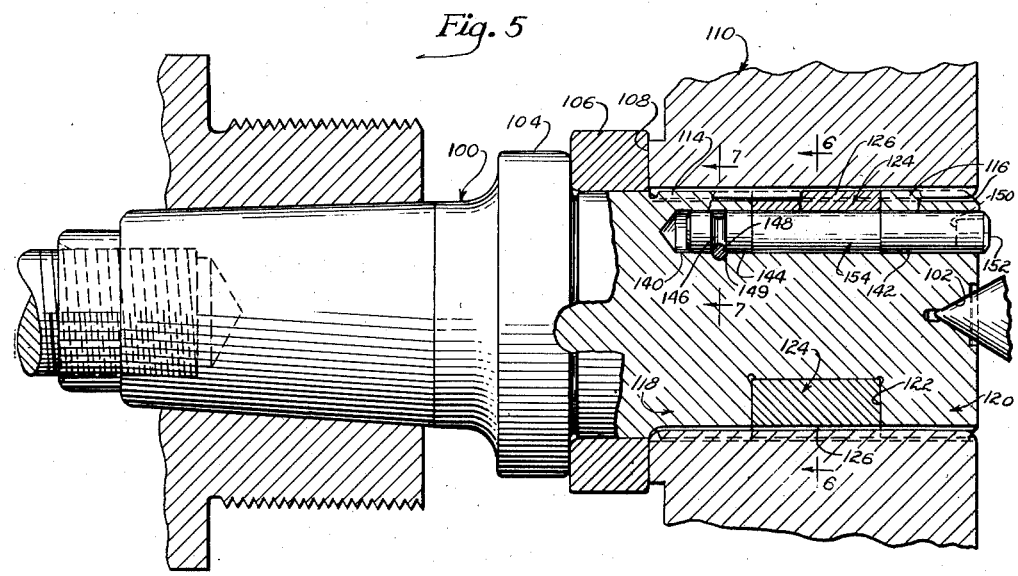
Figure 6:
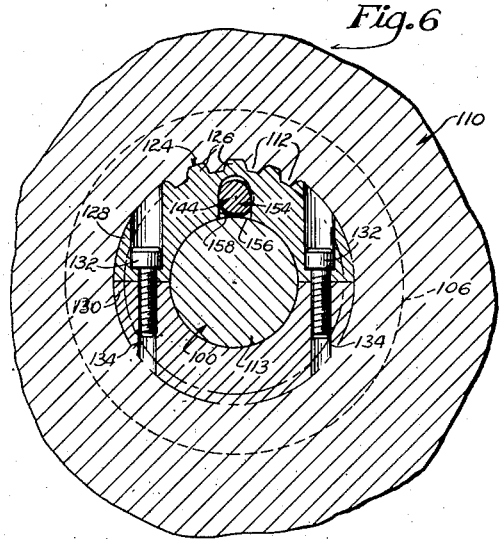
Figure 7:
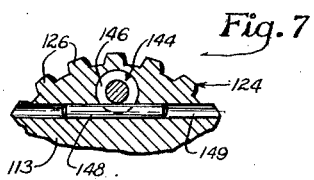

Figs. 5, 6 and 7 show an adaptation of my invention to a spline arbor 100 having an end centering recess 102 for positioning in a lathe. The arbor 100 may have a flange 104 against which an abutment or workpiece-positioning collar 106 may be placed for engagement by an end 108 of an impeller or other workpiece 110 having internal spline teeth 112. The collar 106 is disposed about a cylindrical shaft section 113 having axially spaced series of identical registered spline teeth 114 and 116 which for convenience may be referred to as fixed spline rings 118 and 120, leaving an intervening annular space 122 in which an adjustable middle spline ring 124, having spline teeth 126, is accommodated, the middle spline ring being formed of two mating semi-cylindrical parts 128 and 130, adapted to be separately fitted in the space 122 and then secured together as by screws 132 having preferably wrench socket heads and threaded into tapped holes 134 in one of the mating parts.

The fixed spline rings 118 and 120 are formed with registering bores 140 and 142 for journaling a cylindrical cam rod 144, said rod having an annular groove 146 in which a pin 148, driven in a hole 149 in the shaft section 113, extends to confine said rod to rotary motion, said rod having a wrench socket 150 at its free end 152. The portion 154 of the rod 144 extending across the annular groove 122 constitutes the cam locking portion thereof and is formed and cooperates with the parallel sides 156 and 158 of the slot 160 in the middle spline ring 124 substantially like the corresponding structure described above.

Figs. 8 to 12 show another modification of my invention, particularly suited for workpieces to be subjected to heavy machining operations. In this form, an arbor 200, having centering end recesses 202 for mounting on a lathe, has fixed axially spaced external spline rings 204 and 206 with their respective teeth 208 and 210 identical and in register, and an intervening annular space or groove 212 for the reception of an adjustable middle spline ring 214 having teeth 216 identical with the aforesaid teeth. The arbor 200 is formed with a longitudinal bore 218 parallel to its axis and so located that, in the reduced arbor shaft section 220 defining the bottom of the annular space 212, the major portion of said bore, considered cross-sectionally, is formed as a part-cylindrical groove 222. The arbor 200 has a preferably reduced bore 224 coaxial with the bore 218.

A cam rod 226 has cylindrical portions 228 and 229 disposed in the bores 218 and 224, respectively, with an intermediate cut-away locking cam portion 230 seated in and projecting radially from the groove 222 and into a 90° V-groove 232 with flat sides 234, 236 formed at the inner periphery 238 of the middle spline ring 214. Adjacent quadrants of the cam portion 230 are cut away symmetrically to provide curved cam surfaces 240 and 242 of progressively reduced radius from the juncture 244 of said quadrants, and parallel flat surfaces 246 and 248 extending tangentially from the minimum radial portions of said curved surfaces and terminating at the cylindrical surface of the rod. The flat surface 246 is in flatwise engagement with the side 234 of the V-groove 232 (as shown in Fig. 10) when the middle ring 214 is in neutral position (Fig. 8), i. e., when the teeth 216 of said ring are in register with the fixed arbor teeth 208 and 210, enabling the internal teeth 250 of a workpiece 252 to be placed in splined relation thereto. The free end 254 of the cam rod 226 has a wrench socket 258. In order to lock the workpiece 252 to the arbor 200, the operator applies a wrench to the socket 258 and rotates the rod 228 in the direction of the arrow 260, thereby causing portions of progressively increasing radius on the curved cam surface 240 to slide relative to the side 234 of the V-groove 232 and thus shift the middle spline ring in a clockwise direction (Fig. 10) so that each internal tooth 250 of the workpiece 252 is clamped vise-like at the end portions 262 at one side by the fixed spline ring teeth 208, 210 and at the intermediate portion 264 at the other side by the middle spline ring teeth 216, the engagement between the cam surface and the groove side being wedge-like to insure against accidental disturbance. The ultimate limit of such movement is reached, in the absence of a workpiece, when the flat tangential surface 248 is in flatwise engagement with the V-groove side 236. The V-groove side 236 during such movement is unobstructed because it engages portions of the cam surface 242 of progressively reduced radius. When it is desired to release the workpiece, the operator applies a wrench to the socket 258 and turns the cam rod 226 counter-clockwise, causing portions of progressively increased radius of the cam surface 242 to slide against the surface 236 of the V-groove 232 and thereby rotating the middle spline ring 214 counter-clockwise until the flat tangential surface 246 comes into flatwise engagement with the V-groove side 234, when the several spline teeth are again in register. The V-groove side 234 during this latter movement is unobstructed because it engages portions of the cam surface 240 of progressively reduced radius.

The middle spline ring 214 is formed of two semi-cylindrical parts 270 and 272 which are fitted in the annular space 212 and secured together as a complete ring as by screws 274 threaded into tapped holes 276 in one of the parts and having wrench socket heads seated in the other part.

The reduced portion 229 of the cam rod 226 has an external annular groove 280 in which is disposed a pin 282 driven in a hole 284 in the fixed spline ring 204 for confining the rod to rotary motion.

The V-groove 232 is of relatively small depth due to the location of the major portion of the rod 226 in the shaft portion 220, so that the middle spline ring 214, outwardly of the V-groove, is of substantial thickness and hence of sufficient strength to withstand the stresses resulting from heavy machining operations on the workpiece 252.

Figs. 13 to 16 show a form of internal spline chuck 294 made in accordance with my invention. This form may include a backing plate 296 to which the flange 298 of a spline chuck body 300 is connected as by screws 302 which may also be employed to mount the backing plate and body on a suitable rotating member 304 of a lathe or other suitable machine tool. The body 300 has a sleeve 306 which is formed with an internal spline ring 308 having teeth 310, and is counterbored at 312 for the reception of an adjustable middle internal spline ring 314 having teeth 316 identical with the aforesaid teeth. The sleeve 306 is further counterbored at 330 for the reception of an outer internal spline ring 332 having teeth 334 identical with the aforesaid teeth and formed externally with a keyway 336 in which a pin or dowel key 338 projects from the sleeve 306, whereby said spline ring is held against rotation. Beyond the outer face 339 of the spline ring 332, the sleeve 306 is formed with an inner annular groove 340 in which a split snap retainer spring ring 342 is slipped, whereby the spline rings 314 and 332 are retained in assembly with the body 300.

The middle spline ring 314 has a slot 350 parallel to its axis and interrupting its outer periphery 352 and having parallel sides 354 and 356. The portion of the sleeve 306 adjacent the inner side 357 of the middle spline ring 314 has a bore 358 in which the cylindrical portion 360 of a cam rod 362 is rotatably received, said rod having a reduced cam extension 364 which fits in the slot 350 and cooperates with the sides 354 and 356 thereof, as will appear. The backing plate 296, adjacent the body 300, has a counterbore 366 coaxial with the rod portion 360 coaxial with the rod portion 360 and a coaxial bore 368 of reduced diameter for admitting corresponding portions 370 and 372 of the rod 362. The rod portion 372 extends free of the backing plate 300, and receives a handle 374 securely held thereon by a pin 376 and jam nuts 378 applied to the threaded end 380 of the rod 362, a washer 382 surrounding said rod portion between the backing plate and the handle.

The cam portion 364 of the cam rod 362 is symmetrically cut away at diametrically opposite quadrants to provide curved cam surfaces 390 and 392 of progressively reduced radius from the normal cylindrical surface of the rod and tangential flat surfaces 400 and 402 extending from the portions of minimum radius to the adjacent cylindrical surface. The distance between said cam surfaces 390 and 392, through the axis of the cam rod 362, is uniform for all portions of the respective cam surfaces, and is exceeded by the width of the slot 350 only to the extent enabling said surfaces to have sliding contact with the sides 354 and 356 of the slot during rotation of the cam rod. When the parts are arranged with the flat surface 400 in flatwise engagement with the side 354 of the slot 350, as shown, the internal teeth 310, 316 and 334 of all of the spline rings 308, 314 and 332 are in register, so that the external spline teeth 406 of a workpiece 408 may be readily slipped into splined relation to all of the internal teeth. To lock the workpiece 408 in the spline chuck, the operator rotates the handle 374 in the direction indicated by the arrows 410, with the result that portions of the locking cam surface 390 of progressively increasing diameter engage the side 354 of the slot 350, thereby shifting the middle spline ring 314 in the direction indicated by the arrow 411 (Fig. 14) until each tooth 316 of the middle spline ring grips the intermediate portion 412 of an external tooth 406 of the workpiece 408 at one side while a tooth 310, 334 of each of the relatively fixed internal spline rings 308, 332 grips end portions 414 of said external tooth at the opposite side with a vise-like pressure, the locking cam surface 390, as said pressure is increased, being forcibly wedged against the adjacent side 354 of the slot 350 to provide in effect a positive lock which will not be accidentally disturbed.

In no event can the rod 362 be so turned beyond the position at which the flat surface 402 engages the side 356 of the slot 350. To release the workpiece 408, the operator rotates the handle 374 in the opposite direction, whereupon the cam surface 392 of the rod 362 cams the wall 356 of the slot 350 to turn the middle spline ring 314 in the direction of the arrow 416 (Fig. 14) until the flat surface 400 again comees into flatwise engagement with the side 354 of the slot, thus re-registering the spline teeth 316 of the middle ring 314 with the spline teeth 310, 334 of the fixed rings 308, 332. Adjustment of the middle spline ring in either direction is unobstructed by virtue of the fact that in each case the inactive curved cam surface recedes from the inactive wall of the slot 350 by the amount by which the active curved cam surface advances the active wall of the slot.

Figs. 17, 18 and 19 show another form of internal spline chuck, indicated generally at 420. It may comprise a plate-like body 422 assembled with an inner internal spline ring 424 having teeth 426 and having a sleeve 428 in which is disposed an adjustable middle spline ring 430 having internal teeth 432 identical with the aforesaid teeth. An outer internal spline ring 434, having teeth 436 identical with the aforesaid teeth 426 and 432, is engaged with the free end 438 of the sleeve 428 and projects somewhat in said sleeve adjacent the middle spline ring 430, the plate 422 and inner and outer spline rings 424 and 434 being secured together by bolts 440 and confining the middle spline ring 430 to rotary movement, caused by means presently to be described.

The middle spline ring 430 has an external longitudinal slot 442 interrupting the outer periphery 444 of said ring, said slot having parallel sides 446 and 448. The inner and outer spline rings 424 and 434 have bores 450 and 451 which are co-axial with a bore 452 and counterbore 454 in the backing plate 422, the various bores being co-axial and alined with the middle ring slot 442. A cam rod 456 is dimensioned to correspond with the various bores 450, 452 and 454 and fitted thereinto, said rod having an enlargement 458 confining said rod to rotary motion, the outer end 460 of said rod being disposed at the free face 462 of the backing plate 422 and being formed with a wrench socket 464. The portion 466 of the cam rod 456 disposed in the middle ring slot 442 is symmetrically cut away to provide 90° curved cam surfaces 468 and 470 in diametrically opposite quadrants, each such surface being of progressively reduced radius from the normal cylindrical surface of the rod, and to provide, in the quadrant adjacent the minimum radius ends of said surfaces, flat surfaces 472 and 474 extending tangentially from said ends and terminating in the normal cylindrical surface 476 of the rod portion 466, the distance between said curved cam surfaces for all portions thereof through the axis 478 of the rod being uniform and said curved surfaces having simultaneous sliding engagement with the respective walls 446 and 448 of said slot. As will be understood from various explanations above, rotation of the cam rod 456 in a clockwise direction as indicated by the arrow 480 in Fig. 18 will have the effect of turning the middle spline ring 430 in the direction of the arrow 482 sufficiently to cause the teeth 432 thereof to cooperate with the teeth 426 and 436 of the relatively fixed inner and outer spline rings 424 and 434 to grip the external spline teeth 484 of a workpiece 486 vise-fashion and maintain the grip without danger of accidental loosening. Likewise, rotation of the cam rod 456 in the opposite direction will release the grip and, when such rotation is completed, which occurs when the flat surface 474 engages the side 448 of the slot 442, the teeth 432 of the middle spline ring 430 will be brought into register with the teeth 426 and 436 of the inner and outer spline rings 424 and 434, so that the workpiece may be readily slipped into and out of mesh with the spline chuck 420.

The workpiece 486 may be of any form. If it is hollow, as shown, and the work to be performed involves precision machining which must be concentric to the pitch circles of the workpiece spline teeth 484, provision is made for properly mounting the chuck 420 for that purpose. To this end, the backing plate 422 is made hollow with an axial frusto-conical opening 488 which will accommodate the usual 60° center 490 of a lathe or other machine tool, the frusto-conical opening being co-axial with the various spline teeth.

In the constructions above described, the cam rod is directly operated against the adjustable spline ring and the cam is eccentrically located. Figs. 20 to 23 show a form of spline chuck employing a similar principle but in which the camming operation is somewhat indirect and the chuck is approximately in static and dynamic balance to render it particularly (though not exclusively) useful where the workpiece 498, such as an impeller, is to be tested and treated to have static and dynamic balance. This arbor is indicated generally at 500 and has reduced ends 501 and 502. The arbor 500 has an intermediate enlarged cylindrical shaft portion 504 having integral inner and outer external spaced spline rings 506 and 508 having identical registered spline teeth 510 and 512, respectively, the space 514 between said rings being in a form of an annular groove in which is disposed an adjustable middle spline ring 516 having external teeth 517 identical with and adapted to be rotated into and out of register with and to cooperate with the aforesaid teeth in chucking the internal spline teeth 518 of the workpiece 498. The middle spline ring 516 is formed of two halves 519 and 520 held together preferably by socket head screws 522. The reduced part 524 of the shaft portion 504 defining the bottom of the annular groove 514 has a diametrical slot 526 in which is non-rotatable but longitudinally slidable a cam element 528 whose ends 530 and 532 project radially outward into inner diametrically opposite longitudinal slots 534 and 536, respectively, formed in the middle spline ring 516. One side 538, 540 of each spline ring slot 534, 536 is inclined to cooperate camwise with an inclined face 542, 544 of each projecting end portion 530, 532 of said cam element 528, and, when the spline teeth 517 of the middle spline ring 516 are in register with the spline teeth 510, 512 of the other two rings 506, 508, the arrangement of the parts is as shown in Fig. 21.

An axial bore 550 is formed in the arbor end 502 and a portion of the shaft section 504 and intersects the diametrical slot 526, and contains a cylindrical cam rod 552 having an annular external groove 554 in which are disposed opposite keeper pins 556 driven in holes 58 in the shaft section, one of said pins being sufficient to confine said rod to rotary motion and the other pin being provided for static balance.

The rod 52 has an end cam portion 562 which projects into a transverse slot 564 in the cam eleemnt or pin 528, said slot having parallel sides 566 and 568 which have simultaneous engagement with opposite curved cam surfaces 570 and 572 of the cam portion 562. The cam portion 562 is symmetrically cut away on opposite sides to provide in diametrically opposite quadrants the curved cam surfaces 570 and 572, each of gradually reduced radius from the normal cylindrical surface of an intermediate quadrant, shown at 574, and further cut away to provide, at the minimum radial ends of said cam surfaces, tangential flat surfaces 576 and 578 90° to each other, the diametrical distance between said cam surfaces, measured through the axis 580 of the cam rod 552, being uniform for all portions of said cam surfaces.

The outer end of the cam rod 552 has a wrench socket 582 to receive a wrench for rotating the cam rod from its neutral position, shown in Figs. 20 and 21, when the teeth 517 of the middle spline ring 516 are in register with the teeth 510, 512 of the relatively fixed spline rings 506, 508, so that the workpiece 498 may be readily slipped to the position shown in Fig. 20, in a clockwise direction, as indicated by the arrows 584, to shift the middle spline ring in the direction indicated by the arrow 585 to cause each internal spline tooth 518 of the workpiece to be gripped viselike intermediately by the middle spline ring teeth on one side and at the end portions by the fixed spline teeth on the other side, as may be gathered from Figs. 4 and 22. By virtue of the engagement of portions of progressively increasing radius of the curved cam surface 570 with the side 566 of the slot 564, the cam pin 528 is forced in the direction of the arrow 586 (Fig. 21), causing the inclined cam surface 542 of the end 530 of the pin to act on the adjacent inclined cam surface 538 of the middle spline ring slot 534 so as to shift the middle spline ring in the direction of the arrow 585, said slot being wider than said end of the pin to provide clearance for such shift of the middle spline ring. As portions of progressively increasing radius of the curved cam surface 570 engage one side 566 of the slot 564 in the middle spline ring shifting operation, portions of progressively reduced radius on the other curved cam surface 572 confront the other side 568 of said slot to permit the cam pin 528 to move in the diametrical hole 526, the locking cam surface 576, when the workpiece 498 is clamped on the arbor chuck 500, being securely wedged and in effect locked against the adjacent slot side 566 so that it cannot accidentally be loosened. The arrangement of the parts at this point is shown in Fig. 22.

With the workpiece 498 clamped to the chuck 500, the assembly may be supported at its end spindles 501, 502 on knife edges (not shown) and the workpiece tested and treated to statically balance the same, and then the assembly is placed in a dynetic balancing machine to test and correct the workpiece for dynamic balance.

When the workpiece 498 is to be released, the operator inserts a wrench into the cam rod socket 582 and rotates the cam rod 552 in a counter-clockwise direction, as indicated by the arrow 588 in Fig. 22, whereupon the two curved cam surfaces 570 and 572 reverse their previous roles in cooperation with the respective sides 566 and 568 of the cam pin slot 564, the pin 528 being caused to move in the direction of the arrow 590 so that the inclined cam surface 544 of the other end 532 of the cam pin 528 engages the adjacent inclined cam side 540 of the other slot 536 in the middle spline ring 516 to turn the latter counter-clockwise as shown by the arrow 592 (Fig. 22), so that, when the flat tangential surface 576 reaches the position shown in Fig. 21, the middle spline ring teeth 517 are again in register with the fixed spline teeth 510 and 512, whereupon the workpiece is free to be slid off the chuck 500.

Figs. 24 to 29 show generally at 600 a still further form of chuck according to my invention, wherein a cam rod 602 similar to certain of the cam rods previously described operates on a plurality of other parts to bring about the desired shift of the middle spline ring. In this construction there is provided a body 603 having a backing plate 604 and a shaft extension or hub 606 comprising spaced inner and outer fixed spline rings 608 and 610 having external teeth 612 and 614 and an intervening annular groove 616 in which is rotatably received an adjustable middle spline ring 618 having teeth 620 and formed of two halves 621 held together as by socket head screws 622, all of said teeth being identical. The hub 606 has a bore 624 which extends through the outer spline ring 610 and into the intermediate reduced portion 626 and merges into a tapered bore 628 extending through the remainder of the hub and partly into the backing plate 604, said tapered bore merging with a substantially enlarged cylindrical counter-bore 630 in the backing plate and providing a shoulder 632.

A plunger shown generally at 636 has a stem 637 with a cylindrical reduced free end portion 638 which fits into the cylindrical bore 624, an adjacent tapered portion 640 which fits into the tapered opening 628 but whose taper is of smaller angularity, and a cylindrical head 642 which fits in the counter-bore 630 and is capable, as will appear, of combined longitudinal and rotary sliding movement therein. A helical slot 644 is formed in the outer periphery 646 of the plunger head 642, and a pin 648 threaded radially in the backing plate 604 projects inwardly of the periphery of the counter-bore 630 into the helical slot.

The backing plate 604 has diametrically alined keyways 656 and bores 658 and 660 and the machine tool may have a chuck 662 therefor arranged with its axis vertical and corresponding keyways 663 and bores 664 and 666. Keys 667 are fitted in the respective keyways 656 and 663 to aline the bores 658 and 660 with the bores 664 and 666. The plunger head 642 has a diametrical elongated slot 668 held in line with the bores 658 and 660 by the cam rod 602 which extends therethrough and through all of said bores and is journaled in bushings 670 and has its ends 672 and 674 extending beyond the periphery of the machine tool chuck 662, a washer 675 and a handle 676 being disposed about one end 672 and secured at 678 thereat, and a collar 686 being secured at 688 to the end 674, whereby the cam rod is confined to rotary movement. The cam rod 602 has an intermediate cam portion 690 which passes through the plunger head slot 668. The cam portion 690 is cut symmetrically on opposite sides to provide, throughout diametrically opposite quadrants thereof, curved cam surfaces 692 and 694 of progressively reduced radius from the normal cylindrical surface 696 of one of the intervening quadrants, and, at the minimum radial portions of said curved cam surfaces, tangential surfaces 704 and 706 90° apart. The distance between the cam surfaces 692 and 694 through the axis 707 of the cam rod 602 is uniform for all portions of the respective cam surfaces, and said cam surfaces have simultaneous sliding engagement with the parallel sides 708 and 710 of the slot 668.

The plunger stem end portion 638 has a diametrical axially elongated slot 716 and the reduced hub portion 626 has diametrically opposite radial circumferentially elongated slots 718 which partially register with the plunger slot 716. The middle spline ring 618 has diametrically opposite holes 720 in which is driven a preferably cylindrical pin 722 which passes through and has sliding engagement with the sides of the hub slots 718 and the plunger slot 716, as shown in Figs. 26 and 29. The ends 724 and 726 of each hub slot 718 and the ends 727 and 728 of the plunger slot 716 are spaced apart a distance exceeding the diameter of the pin 722.

With the parts arranged as shown, the flat surface 706 of the cam rod 602 is engaged with the side 710 of the plunger slot 668, so that counterclockwise rotation of the cam rod, looking at Fig. 27, cannot occur, the teeth 620 of the middle spline ring 618 are in register with the teeth 612 and 614 of the fixed spline rings 608 and 610, and the handle 676 extends upward so that the weight 730, disposed at the outer end of the handle, is uppermost. Now the internal spline teeth 734 of the workpiece 736 are slipped into splined relation with all of the arbor spline teeth. The knob 738, extending from the weight 730, is now grasped and pulled to the right (Figs. 24 and 25) sufficiently to enable the weight to swing by gravity, whereupon the handle 676 and, with it, the cam rod 602 will rotate clockwise. Such rotation of the cam rod 602 effects axial movement of the plunger 636 in the direction of the arrow 740 by virtue of the cam action of the cam surface 694 against the side 710 of the plunger head slot 668, the opposite cam surface 692 being radially relieved as aforesaid to permit the other side 708 of the slot to shift correspondingly, and, due to the co-action of the inner end of the stationary pin 648 with the sides of the helical slot 644, the plunger will have slight rotary movement at the same time in the direction of the arrow 742 (Fig. 26). Accordingly the pin 722, and with it the middle spline ring 618, is rotated to cause the middle spline ring teeth 620 to move out of register with the fixed spline ring teeth 612 and 614 and cooperate with said fixed teeth in securely clamping the internal teeth 734 of the workpiece 736 vise-fashion, the handle 676 having by that time turned through a substantial angle as indicated by the dash-dot lines in Fig. 25. It will be noted that the lengths of the plunger stem slot 716 and the hub slots 718 substantially exceed the diameter of the pin 722 to provide for lost motion due to the combined axial and rotary movement of the plunger 636, and that the cam surface 694 has a locked wedge engagement with the side 710 of the slot 668, said engagement being releasable only upon manual rotation of the handle 676 counter-clockwise (Fig. 25). Upon such counter-clockwise movement of the handle 676, the pressure of the middle spline ring teeth against the workpiece spline teeth is relaxed, enabling the workpiece 736 to be readily slipped off, and when such movement is completed, the flat surface 706 of the cam rod 602 is again in contact with the side 710 of the plunger slot 668, and all of the chuck spline teeth are again in register, enabling another internally splined workpiece to be slipped on the chuck.

The form of my invention shown in Figs. 30, 31 and 32 is also of the indirect external manual type but, although somewhat similar to the form shown in Figs. 24 to 29, is adapted for a different kind of installation and accordingly in certain respects differs therefrom. As shown in Fig. 30, I provide a spline chuck arbor generally indicated at 750 and comprising a shaft body 752 having spaced fixed inner and outer external spline rings 754 and 756 having teeth 758 and 760, respectively, and an intervening adjustable spline ring 762 having teeth 764 identical with the aforesaid teeth and made in two parts 766 and 768 connected together as by socket head screws 770. The shaft 752 is hollow and has a cylindrical end bore 772 extending through the fixed spline rings and adjacent reduced shaft portion 774 and merging with a co-axial tapered bore 776 terminating at its larger end at the shoulder 778 of a cylindrical counter-bore 780 at the other end 782 of the shaft. A plunger 784 has a stem 786 including a cylindrical end portion 788 slidably fitted in the bore 772, a tapered portion 790 of smaller angularity than and disposed in the tapered bore 776 and adapted to project into the counter-bore 780, and a cylindrical head 792 slidably engaging the peripheral wall 794 of the counter-bore 780. A keeper plate 796 is secured at 798 to the adjacent end 782 of the shaft 752 and serves as a stop engageable with the free end 800 of the plunger head 792 to limit movement of said head in the direction in which said head is urged by springs 802 seated in preferably three equally spaced holes 804 formed in the head, said springs being under compression between said head and the shoulder 778.

The end 800 of the plunger head 792 has a center ball socket 806 in which is received a ball 804 forming one end of a ram 808, the other end 810 of which has a diametrical slot 812 in which a cam 814 is slidably engageable, said cam being in the form of a collar keyed at 816 or otherwise suitably secured to a shaft 818 journaled as at 820 and carrying a handle 822 secured to the shaft as at 824. A quadrant of the cam 814 is in the form of a curved cam surface 826 of progressively reduced radius from one end 828 to the other end 830, the cam having flat surfaces 832 and 834 tangent to said ends.

The plunger head 792 has a helical slot 840 and the adjacent end portion 782 of the shaft 752 has a radial bore in which a pin or dowel 842 is driven, said pin projecting into and cooperating with the sides of the helical slot as noted in the form just described and as will appear. The cylindrical end 788 of the plunger stem 786 has an axially elongated diametrical slot 844 and the reduced portion 774 of the shaft 752 has diametrically opposite radial circumferentially elongated slots 846 through all of which extends a preferably cylindrical pin 847 driven in diametrically opposite radial holes 848 in the middle spline ring 762, said pin having sliding engagement with the walls of said slots.

The spline chuck 750 is adapted to be keyed as at 850 to a machine tool chuck plate 852 adapted to be keyed as at 854 and bolted as at 856 to a machine tool chuck head 858 bored as at 860 to provide a bearing and guide for the body portion 862 of the ram 808, rotation of which is prevented by the cam 814.

When the several parts are arranged as shown, the middle spline ring teeth 764 are in register with the fixed spline ring teeth 758 and 760, so that the spline chuck 750 is prepared to receive the internal spline teeth 866 of a workpiece 868. To clamp the workpiece on the spline chuck 750, the operator rotates the handle 822 in the direction indicated by the arrow 870 (Fig. 30), thereby rotating the cam shaft 818 and with it the cam 814 in the direction of the arrow 872 (Fig. 32) and forcing portions of the curved cam surface 826 of progressively increasing radius against the base 874 of the ram slot 812 to thereby impart axial movement to the ram 808, whose ball 804 thus forces the plunger 784 in the direction of the arrow 876, against the resistance of the springs 802. By virtue of the coaction of the side 878 of the helical slot 840 with the relatively stationary dowel 842, the plunger 784 will be subjected to a rotary motion also, with the result that the pin 846 and consequently the middle spline ring 762 will rotate, causing the middle spline ring teeth 764 to move out of register with the fixed spline teeth 758 and 760 and thus clamping the internal spline teeth 866 of the workpiece 868 vise-fashion between the middle spline ring teeth intermediately at one side and the fixed spline ring teeth at the ends of the other side of each workpiece tooth. When the clamping is effected, the curved cam surface 826 is in tight and effectively locked wedging engagement with the bottom surface 874 of the ram slot 812, so that accidental disturbance of the cam 814 cannot occur.

To release the workpiece 868, the operator rotates the handle 822 and hence the cam 814 in the opposite direction, thereby releasing the wedging engagement and permitting the springs 802 to reverse the translatory and rotary motion of the plunger 784 until the end 800 of the plunger head 792 abuts the keeper plate 796, and when this abutment takes place, the middle spline ring teeth 764 are again in register with the fixed spline ring teeth 758 and 760, enabling the workpiece to be removed.

In the construction just described, the plunger is moved in one direction by a manually actuated ram and is spring-returned. In some installations provision is made for operating the ram hydraulically or pneumatically, so that the ram moves the plunger in both direction and hence no spring-return is used. Such an arrangement is shown in Figs. 33 to 38. Parts of the mechanism shown in Figs. 33 to 38 which are identical with those just above described are like-numbered. The plunger 900 differs from the plunger 784 in that, instead of having a ball socket, it has at the free end 902 of its head 904 a tapped axial opening 906 in which the end 908 of a ram 910 is threaded. The ram 910 is a piston rod whose other end is connected to a piston 912 which moves in a hydraulic or pneumatic cylinder 914, the admission and exhaust of the hydraulic or pneumatic medium being controlled in any suitable manner by means not shown. The operation of this form of my invention is like that of the form shown in Figs. 30 to 33, except that the return movement of the plunger 900, which is to the right, looking at Fig. 33, is effected positively by fluid pressure applied to the end 916 of the cylinder 914. The piston 912 is capable of rotation as well as translation in the cylinder, so that the piston will turn not only pursuant to the slight rotary motion of the plunger 900 in its forward and return movements, but also as a unit with the arbor when the workpiece 868 is subjected to machining operations.

Various modifications coming within the spirit of my invention may suggest themselves to those skilled in the art, and hence I do not wish to be limited to the specific forms shown or uses mentioned, except to the extent indicated in the appended claims, which are to be interpreted as broadly as the state of the art will permit.

I claim:

1. A spline chuck comprising a body including relatively fixed axially spaced spline teeth, means rotatable relative to and including a spline tooth disposed between said spaced spline teeth, a rotatable element carried by said body, cam means actuatable by said element and including a pair of cam surfaces, said rotatable means having a pair of faces adjacent and co-operative with the respective cam surfaces, one cam surface being operative against the face adjacent thereto to rotate said rotatable means in a direction to bring said tooth out of register with said fixed teeth to clamp a spline tooth of a workpiece between said fixed teeth on one side and said tooth of said rotatable means on the other side, when said element is rotated in one direction, the other cam surface being operative against the face adjacent thereto to rotate said means in the opposite direction to unclamp the spline tooth of the workpiece, when said element is rotated in the other direction.

2. A chuck comprising a body including relatively fixed spaced members each having a tooth, means movable relative to and including a tooth between said spaced members, a movable actuating element carried by said body, cam means actuatable by said element and including a pair of cam surfaces, said movable means having a pair of faces adjacent and co-operative with the respective cam surfaces, one cam surface being operative against the face adjacent thereto to move said movable means in a direction to clamp a tooth of a workpiece between said spaced teeth on one side and said tooth of said movable means on the other side, when said element is moved in one direction, the other cam surface being operative against the face adjacent thereto to move said movable means in the opposite direction to unclamp the tooth of the workpiece, when said element is moved in the other direction.

3. A chuck comprising a body including relatively fixed spaced members each having a tooth, means movable relative to and including a tooth between said spaced members, a movable actuating element carried by said body, cam means actuatable by said element and including a pair of cam surfaces, said movable means having a pair of faces adjacent and co-operative with the respective cam surfaces, one cam surface being operative against the face adjacent thereto to move said movable means in a direction to clamp a tooth of a workpiece between said spaced teeth on one side and said tooth of said movable means on the other side, when said element is moved in one direction, the other cam surface being operative against the face adjacent thereto to move said movable means in the opposite direction to unclamp the tooth of the workpiece, when said element is moved in the other direction, both of said cam surfaces being at all times engaged with the respective faces.

4. A spline chuck for a workpiece which, when finished, is to be in static balance, said chuck comprising a cylindrical body having fixed spaced coaxial spline rings whose teeth are identical and in register and an intervening body portion of reduced thickness, providing an annular space, a relatively rotatable coaxial spline ring fitted in said space and having teeth identical with and adapted to be rotated into and out of register with the aforesaid teeth, said body portion having a diametrical hole therethrough, a cam pin diametrically slidable in said hole, said rotatable spline ring having diametrically opposite openings into which the ends of said pin project, said openings at one side of said pin being tapered and the adjacent sides of the ends of said pin being engageable cam-wise selectively with the respective tapered sides of said openings, pursuant to movement of said pin selectively in one direction or the other in said hole, to cam said rotatable ring selectively in one direction of rotation or the other, and means coaxial with said rings and operative to shift said pin selectively in one or the other direction in said hole, whereby said rotatable spline ring may be rotated in a direction to cause its teeth to move out of register with the fixed spline teeth and clamp the spline teeth of a workpiece, in which event the weight of said pin at opposite sides of the axis of said rings is substantially the same, or in the opposite direction to reregister the several spline teeth of said chuck to enable the workpiece to be removed.

5. A spline chuck for a workpiece which, when finished, is to be in static balance, said chuck comprising a cylindrical body having fixed spaced co-axial spline rings whose teeth are identical and in register and an intervening body portion of reduced thickness, providing an annular space, a relatively rotatable coaxial spline ring fitted in said space and having teeth identical with and adapted to be rotated into and out of register with the aforesaid teeth, said body portion having a diametrical hole therethrough, a cam pin diametrically slidable in said hole, said rotatable spline ring having diametrically opposite openings into which the ends of said pin project, said openings at one side of said pin being tapered and the adjacent sides of the ends of said pin being engageable cam-wise selectively with the respective tapered sides of said openings, pursuant to movement of said pin selectively in one direction or the other in said hole, to cam said rotatable ring selectively in one direction of rotation or the other, and means coaxial with said rings and operative to shift said pin selectively in one or the other direction in said hole, whereby said rotatable spline ring may be rotated in a direction to cause its teeth to move out of register with the fixed spline teeth and clamp the spline teeth of a workpiece, in which event the weight of said pin at opposite sides of the axis of said rings is substantially the same, or in the opposite direction to reregister the several spline teeth of said chuck to enable the workpiece to be removed, said pin having a center transverse slot, said body having an axial cylindrical bore, said means comprising a cylindrical rod movably fitted in said bore, said rod having cam surfaces co-operating with the sides of said pin slot to shift said pin diametrically selectively in one direction or the other.

6. A spline chuck for a workpiece which, when finished, is to be in static balance, said chuck comprising a cylindrical body having fixed spaced co-axial spline rings whose teeth are identical and in register and an intervening body portion of reduced thickness, providing an annular space, a relatively rotatable coaxial spline ring fitted in said space and having teeth identical with and adapted to be rotated into and out of register with the aforesaid teeth, said body portion having a diametrical hole therethrough, a cam pin diametrically slidable in said hole, said rotatable spline ring having diametrically opposite openings into which the ends of said pin project, said openings at one side of said pin being tapered and the adjacent sides of the ends of said pin being engageable cam-wise selectively with the respective tapered sides of said openings, pursuant to movement of said pin selectively in one direction or the other in said hole, to cam said rotatable ring selectively in one direction of rotation or the other, and means coaxial with said rings and operative to shift said pin selectively in one or the other direction in said hole, whereby said rotatable spline ring may be rotated in a direction to cause its teeth to move out of register with the fixed spline teeth and clamp the spline teeth of a workpiece, in which event the weight of said pin at opposite sides of the axis of said rings is substantially the same, or in the opposite direction to reregister the several spline teeth of said chuck to enable the workpiece to be removed, said pin having a center transverse slot, said body having an axial cylindrical bore, said means comprising a rotary cylindrical rod fitted in said bore, said rod having a cam co-operating with the sides of said pin slot to shift said pin diametrically selectively in one direction or the other, said cam comprising diametrically opposite curved surfaces of progressively increased radius, the diametrical distance between said curved surfaces, through the axis of said rod, being uniform for all portions of said curved surfaces and being substantially equal to the width of said pin slot, whereby, as portions of progressively increased diameter of either curved surface engage the adjacent side of said pin slot, said pin will be correspondingly shifted, the increment in radius of said curved surfaces being so slight that, when the workpiece is tightly clamped, one of said curved surfaces will be in tight wedging engagement with the co-operating side of said slot.

7. A spline chuck for a workpiece which, when finished, is to be a static balance, said chuck comprising a cylindrical body having fixed spaced co-axial spline rings whose teeth are identical and in register and an intervening body portion of reduced thickness, providing an annular space, a relatively rotatable coaxial spline ring fitted in said space and having teeth identical with and adapted to be rotated into and out of register with the aforesaid teeth, said body portion having a diametrical hole therethrough, a cam pin diametrically slidable in said hole, said rotatable spline ring having diametrically opposite openings into which the ends of said pin project, said openings at one side of said pin being tapered and the adjacent sides of the ends of said pin being engageable cam-wise selectively with the respective tapered sides of said openings, pursuant to movement of said pin selectively in one direction or the other in said hole, to cam said rotatable ring selectively in one direction of rotation or the other, and means coaxial with said rings and operative to shift said pin selectively in one or the other direction in said hole, whereby said rotatable spline ring may be rotated in a direction to cause its teeth to move out of register with the fixed spline teeth and clamp the spline teeth of a workpiece, in which event the weight of said pin at opposite sides of the axis of said rings is substantially the same, or in the opposite direction to reregister the several spline teeth of said chuck to enable the workpiece to be removed, said pin having a center transverse slot, said body having an axial cylindrical bore, said means comprising a rotary cylindrical rod fitted in said bore, said rod having a cam cooperating with the sides of said pin slot to shift said pin diametrically selectively in one direction or the other, said cam comprising diametrically opposite curved surfaces of progressively increased radius, the diametrical distance between said curved surfaces, through the axis of said rod, being uniform for all portions of said curved surfaces and being substantially equal to the width of said pin slot, whereby as portions of progressively increased diameter of either curved surface engage the adjacent side of said pin slot, said pin will be correspondingly shifted, the increment in radius of said curved surfaces being so slight that, when the workpiece is tightly clamped, one of said curved surfaces will be in tight wedging engagement with the co-operating side of said slot, said cam having a flat surface tangent to the portion of minimum radius of each curved surface and selectively engageable with the respective sides of said pin slot to limit the rotation of said rod in each direction, one of said flat surfaces engaging one of said pin slot sides when all of the spline teeth of said chuck are in register.

8. A spline chuck comprising a body, axially spaced spline rings fixed to said body and having registering teeth, a relatively rotatable spline ring in the space between and on the same axis as said fixed spline rings and adapted to be rotated to bring its teeth into and out of register with said fixed teeth, a member coaxial with said rings, means for imparting axial movement to said member in each direction, means providing an axial lost motion connection between said member and said rotatable spline ring, and means operative upon axial movement of said member to rotate said member, whereby, upon operation of the first mentioned means to move said member in one direction, said rotatable spline ring will rotate to cause its teeth to move out of register with said fixed teeth and thereby cause each spline tooth of a workpiece positioned on said fixed teeth to be locked vise-fashion between a tooth of said rotatable spline ring on one side and fixed spline teeth on the other side.

9. A spline chuck comprising a body including relatively fixed axially spaced sets of registering spline teeth, a device rotatable relative to said body and having a slot and including a set of spline teeth disposed between the aforesaid sets, a rotatable cam carried by said body and having cam surfaces in sliding engagement with the sides of said slot, each of said cam surfaces being of progressively increased radius, whereby, upon rotation of said cam in a direction to cause portions of progressively increased radius of one of said cam surfaces to engage the co-operating side of said slot, said device will be rotatably shifted to bring its set of spline teeth out of register with the spline teeth of said fixed sets, to clamp each spline tooth of a workpiece between a tooth of said rotatable set on one side and a tooth of each of said fixed sets on the other, the increment in radius of said one cam surface being so slight that when the workpiece spline teeth are tightly clamped between the several sets of teeth, said one cam surface will be in tight wedging engagement with said co-operating side of said slot, means limiting such rotation of said cam, and whereby, upon rotation of said cam in the opposite direction, portions of progressively increased radius of the other cam surface will similarly engage the other side of said slot and thereby rotate said device until its spline teeth are in register with said fixed teeth, and means stopping such opposite rotation of said cam when the teeth of all of said sets are in register.

10. A spline chuck comprising a body including relatively fixed axially spaced sets of registering spline teeth, a device rotatable relative to said body and having a slot and including a set of spline teeth disposed between the aforesaid sets, a rotatable cam carried by said body and having cam surfaces in sliding engagement with the sides of said slot, each of said cam surfaces being of progressively increased radius, whereby, upon rotation of said cam in a direction to cause portions of progressively increased radius of one of said cam surfaces to engage the co-operating side of said slot, said device will be rotatably shifted to bring its spline teeth out of register with said fixed sets, to clamp each spline tooth of a workpiece between a tooth of said rotatable set on one side and a tooth of each of said fixed sets on the other, the increment in radius of said one cam surface being so slight that when the workpiece spline teeth are tightly clamped between the several sets of teeth said one cam surface will be in tight wedging engagement with said co-operating side of said slot, and whereby, upon rotation of said cam in the opposite direction, portions of progressively increased radius of the other cam surface will similarly engage the other side of said slot and thereby rotate said device until its spline teeth are in register with said fixed teeth.

11. A spline chuck comprising a body including relatively fixed axially spaced sets of registering spline teeth, a device rotatable relative to said body and having a slot and including a set of spline teeth disposed between the aforesaid sets, a rotatable cam carried by said body and having cam surfaces in sliding engagement with the sides of said slot, each of said cam surfaces being of progressively increased radius, whereby, upon rotation of said cam in a direction to cause portions of progressively increased radius of one of said cam surfaces to engage the co-operating side of said slot, said device will be rotatably shifted to bring its spline teeth out of register with said fixed sets, to clamp each spline tooth of a workpiece between a tooth of said rotatable set on one side and a tooth of each of said fixed sets on the other, the increment in radius of said one cam surface being so slight that when the workpiece spline teeth are tightly clamped between the several sets of teeth, said one cam surface will be in tight wedging engagement with said co-operating side of said slot, and whereby, upon rotation of said cam in the opposite direction, portions of progressively increased radius of the other cam surface will similarly engage the other side of said slot and thereby rotate said device until its spline teeth are in register with said fixed teeth, and means stopping such opposite rotation of said cam when all of said spline ring teeth are in register.

12. A spline chuck comprising a body having spaced fixed sets of spline teeth, a relatively rotatable member including a ring disposed between said sets and formed with a set of spline teeth adapted to be moved into and out of register with the aforesaid sets of teeth, said body having a recessed portion affording a bearing for said ring, a cam shaft carried by said body and having curved cam surfaces of identically and progressively increased radius, said cam shaft having a straight portion tangent to the end of each cam surface of least radius, said ring having circumferentially spaced straight portions, one of said cam shaft portions being engaged with one of said straight ring portions when all of said teeth are in register, whereby, when said cam shaft is rotated in a direction to cause portions of progressively increasing radius of the cam surface adjacent one of said straight cam shaft portions to engage said one straight ring portion said member will be rotated to bring its spline teeth out of register with said fixed teeth to thereby clamp the spline teeth of a workpiece, the increment in radius of said cam surfaces being so slight that the last mentioned cam surface, as the clamping pressure is increased, is securely wedged against said one straight ring portion to preclude accidental loosening of said cam shaft, said rotation of said cam shaft being stopped by virtue of the engagement of the other straight cam shaft portion with the other straight ring portion, and whereby, upon return rotation of said cam shaft, portions of progressively increasing radius of said other cam surface will cam against the other straight ring portion to cause reverse rotation of said member until all of said teeth are again in register.

13. A spline chuck comprising a body having spaced fixed sets of spline teeth, a relatively rotatable member including a set of spline teeth between and adapted to be moved into and out of register with said fixed sets of teeth, said body having a recessed portion affording a bearing for said member having a slot in which said cam portion extends, said slot extending parallel to the teeth of said member, whereby, when said cam shaft is rotated in a direction to cause portions of progressively increasing radius of one cam surface to engage a side of said slot, said member will be rotated to bring its spline teeth out of register with said fixed teeth, to thereby clamp the spline teeth of a workpiece, the increment in radius of said cam surfaces being so slight that said one cam surface, as the clamping pressure is increased, is securely wedged against said side to preclude accidental loosening of said cam shaft, and whereby, upon return rotation of said cam shaft, portions of progressively increasing radius of said other cam surface will cam against the other side of said slot to cause reverse rotation of said member until all of said teeth are again in register.

14. A spline chuck comprising a body having axially spaced fixed spline rings, a relatively rotatable spline ring member in the space between and on the same axis as said fixed spline rings, a member co-axial with said rings, means for shifting the second member longitudinally of said axis selectively in each direction and co-operating means on said body and second member for imparting rotary motion to said second member upon such longitudinal shift thereof, one of said members having spaced axially elongated portions, the other member having pin means slidably engageable with said portions, whereby, upon shift of said second member in a predetermined direction, said rotatable spline ring member will rotate to cause each spline tooth of a workpiece meshed with said fixed teeth to be locked vise-fashion between a tooth of said rotatable spline ring member on one side and teeth of said fixed spline rings on the other side.

15. A spline chuck comprising a body having axially spaced fixed spline rings, a relatively rotatable spline ring member in the space between and on the same axis as said fixed spline rings, a member co-axial with said rings and having a face transverse to said axis, a cam having a cam surface engageable with said face to shift the second member longitudinally of said axis, and co-operating means on said body and second member for imparting rotary motion to said second member upon such longitudinal shift thereof, one of said members having spaced axially elongated portions, the other member having pin means engageable with said portions, whereby, upon movement of said cam in a predetermined direction, said cam surface will shift said second member and consequently said rotatable spline ring member will rotate to cause each spline tooth of a workpiece meshed with said fixed teeth to be clamped vise-fashion between a tooth of said rotatable spline ring member on one side and a tooth of each of said fixed spline rings on the other side, said cam surface being of gradually increased radius so as to be tightly wedged against said face when the workpiece is clamped as aforesaid.

16. A spline chuck comprising a body having axially spaced fixed spline rings, a relatively rotatable spline ring member in the space between and on the same axis as said fixed spline rings, a member co-axial with said rings, means for shifting the second member longitudinally of said axis selectively in each direction and co-operating means on said body and second member for imparting rotary motion to said second member upon such longitudinal shift thereof, one of said members having spaced axially elongated portions, the other member having pin means slidably engageable with said portions, whereby, upon shift of said second member in a predetermined direction, said rotatable spline ring member will rotate to cause each spline tooth of a workpiece meshed with said fixed teeth to be locked vise-fashion between a tooth of said rotatable spline ring member on one side and teeth of said fixed spline rings on the other side, and means operative upon retraction of said second member to positively stop said second member when the teeth of said rotatable spline ring member are in register with the teeth of said fixed spline rings.

17. A spline chuck comprising a body including relatively fixed spaced sets of registering spline teeth, means rotatable relative to said body and having a slot and including a set of spline teeth disposed between the aforesaid sets, means for rotating the first means in opposite directions, the second means comprising a rotatable cam carried by said body and having cam surfaces in sliding engagement with the sides of said slot, each of the said cam surfaces being of progressively increased radius, whereby, upon rotation of said cam in a direction to cause portions of progressively increased radius of one of said cam surfaces to engage the co-operating side of said slot, said rotatable means will be rotatably shifted to bring its set of spline teeth out of register with the spline teeth of said fixed sets, to clamp a spline tooth of a workpiece between a tooth of said rotatable set on one side and spline teeth of said fixed sets on the other, the increment in radius of said one cam surface being so slight that, when the workpiece spline tooth is tightly clamped between the several sets of teeth, said one cam surface will be in tight wedging engagement with said co-operating side of said slot, and whereby, upon rotation of said cam in the opposite direction, portions of progressively increased radius of the other cam surface will similarly engage the other side of said slot and thereby rotate said first means until its spline teeth are in register with said fixed teeth, means limiting rotation of said cam in a direction to clamp the workpiece, and means stopping opposite rotation of said cam when the teeth of all of said sets are in register.

18. A spline chuck comprising a body including relatively fixed spaced sets of registering spline teeth, means rotatable relative to said body and including a set of spline teeth disposed between the aforesaid sets, means for rotating the first means in opposite directions, the second means comprising a rotatable cam having a cam surface in engagement with the first means, said cam surface being of progressively increased radius, whereby, upon rotation of said cam in a direction to cause portions of progressively increased radius of said cam surface to engage said first means, said first means will be rotatably shifted to bring its set of spline teeth out of register with the spline teeth of said fixed sets, to clamp a spline tooth of a workpiece between a tooth of said rotatable set on one side and spline teeth of said fixed sets on the other, the increment in radius of said cam surface being so slight that, when the workpiece spline tooth is tightly clamped between the several sets of teeth, said cam surface will be in tight wedging engagement with said first means.

19. A spline chuck comprising a body including relatively fixed spaced sets of registering spline teeth, means rotatable relative to said body and including a set of spline teeth disposed between the aforesaid sets, means for rotating the first means in opposite directions, the second means comprising a rotatable cam having a cam surface in engagement with a portion of the first means, said cam surface being of progressively increased radius, whereby, upon rotation of said cam in a direction to cause portions of progressively increased radius of said cam surface to engage said portion of said first means, said first means will be rotatably shifted to bring its set of spline teeth out of register with the spline teeth of said fixed sets, to clamp a spline tooth of a workpiece between a tooth of said rotatable set on one side and spline teeth of said fixed sets on the other, the increment in radius of said cam surface being so slight that, when the workpiece spline tooth is tightly clamped between the several sets of teeth, said cam surface will be in tight wedging engagement with said portion of said first means, said cam having another cam surface of progressively increased radius and engageable with another portion of said first means, whereby, upon rotation of said cam in the opposite direction, portions of progressively increased radius of said other cam surface will similarly engage said other portion of said first means and thereby rotate said first means until its spline teeth are in register with said fixed teeth.

20. A spline chuck comprising a body including relatively fixed spaced sets of registering spline teeth, means rotatable relative to said body and including a part having a set of spline teeth disposed between the aforesaid sets, means for rotating the first means in opposite directions, the second means comprising a rotatable cam having a cam surface in engagement with a portion of the first means, said cam surface being of progressively increased radius, whereby, upon rotation of said cam in a direction to cause portions of progressively increased radius of said cam surface to engage said portion of said first means, said first means will be rotatably shifted to bring its set of spline teeth out of register with the spline teeth of said fixed sets, to clamp a spline tooth of a workpiece between a tooth of said rotatable set on one side and spline teeth of said fixed sets on the other, the increment in radius of said cam surface being so slight that, when the workpiece spline tooth is tightly clamped between the several sets of teeth, said cam surface will be in tight wedging engagement with said first means, said cam having another cam surface of progressively increased radius and engageable with another portion of said first means, whereby, upon rotation of said cam in the opposite direction, portions of progressively increased radius of said other cam surface will similarly engage said other portion of said first means and thereby rotate said first means until its spline teeth are in register with said fixed teeth, and means for stopping such opposite rotation of said cam when the teeth of all of said sets are in register.

21. A spline chuck comprising a body including relatively fixed spaced sets of registering spline teeth, means rotatable relative to said body and including an element having a set of spline teeth disposed between the aforesaid sets, means for rotating the first means in opposite directions, the second means comprising a rotatable cam having a cam surface in engagement with the first means, said cam surface being of progressively increased radius, whereby, upon rotation of said cam in a direction to cause portions of progressively increased radius of said cam surface to engage said first means, said first means will be rotatably shifted to bring its set of spline teeth out of register with the spline teeth of said fixed sets, to clamp a spline tooth of a workpiece between a tooth of said rotatable set on one side and spline teeth of said fixed sets on the other, the increment in radius of said cam surface being so slight that when the workpiece spline tooth is tightly clamped between the several sets of teeth, said cam surface will be in tight wedging engagement with said first means, said first means comprising a second element rotatable as a unit with the toothed element, means providing a lost motion connection between said elements whereby said second element is movable axially relative to said toothed element, said second means including a coarse helical connection between said body and said first means, whereby said second element rotates when it is moved axially, said cam being arranged to thrust said second element in an axial direction.

22. A spline chuck comprising a body including relatively fixed spaced sets of registering spline teeth, means rotatable relative to said body and including an element having a set of spline teeth disposed between the aforesaid sets, means for rotating the first means in opposite directions, the second means comprising a rotatable cam having a cam surface in engagement with the first means, said cam surface being of progressively increased radius, whereby, upon rotation of said cam in a direction to cause portions of progressively increased radius of said cam surface to engage said first means, said first means will be rotatably shifted to bring its set of spline teeth out of register with the spline teeth of said fixed sets, to clamp a spline tooth of a workpiece between a tooth of said rotatable set on one side and spline teeth of said fixed sets on the other, said first means comprising a second element rotatable as a unit with the toothed element, means providing a lost motion connection between said elements whereby said second element is movable axially relative to said toothed element, said second means including a coarse helical connection between said body and said first means, whereby said second element rotates when it is moved axially, said cam being arranged to thrust said second element in an axial direction.

23. A spline chuck comprising a body including relatively fixed axially spaced spline teeth, means rotatable relative to and including a spline tooth disposed between said spaced spline teeth, a rotatable element carried by said body, cam means actuatable by said element and including a cam surface, said rotatable means having a face adjacent and co-operative with said cam surface, said cam surface being operative against said face to rotate said rotatable means in a direction to move said tooth out of register with said fixed teeth to clamp a spline tooth of a workpiece between said fixed teeth on one side and said tooth of said rotatable means on the other side, when said element is rotated in one direction.

24. A spline chuck comprising a body including relatively fixed axially spaced spline teeth, means rotatable relative to and including a spline tooth disposed between said spaced spline teeth, a rotatable element carried by said body, cam means actuatable by said element and including a cam surface, said rotatable means having a face adjacent and co-operative with said cam surface, said cam surface being operative against said face to rotate said rotatable means in a direction to move said tooth out of register with said fixed teeth to clamp a spline tooth of a workpiece between said fixed teeth on one side and said tooth of said rotatable means on the other side, when said element is rotated in one direction, and means maintaining said cam means at all times in engagement with said face.

25. A chuck comprising a pair of movably connected members, each having a workpiece gripping portion, one of said members having a slot extending transverse to the direction of relative movement of said members, and a shaft journaled in the other member and having a cam having circumferentially spaced curved surfaces of progressively increased radius engaging the sides of said slot to decrease or increase the distance between said gripping portions, depending on the direction of rotation of said shaft.

26. A chuck comprising a pair of movably connected members, each having a workpiece gripping portion, one of said members having a slot extending transverse to the direction of relative movement of said members, a shaft journaled in the other member and having a cam engaging the sides of said slot to decrease or increase the distance between said gripping portions, depending on the direction of rotation of said shaft, said cam comprising circumferentially spaced curved surfaces of progressively increased radius, whereby, as portions of progressively increased radius of either curved surface engage the adjacent side of said slot, relative movement between said gripping portions will occur, said cam having a flat surface tangent to the portion of minimum radius of each curved surface and engageable with the co-operating side of said slot to limit rotation of said shaft in each direction.

27. A chuck comprising a pair of movably connected members, each having a workpiece-gripping portion, one of said members having a slot extending transverse to the direction of relative movement of said members, a shaft journaled in the other member and having a cam having circumferentially spaced curved surfaces of progressively increased radius engaging the sides of said slot to decrease or increase the distance between said gripping portions, depending on the direction of rotation of said shaft, said cam having a portion of greater radius than either of said curved surfaces and engageable with the sides of said slot to limit the rotation of said shaft in each direction.

28. A chuck comprising a pair of movably connected members, each having a workpiece-gripping portion, one of said members having a slot extending transverse to the direction of relative movement of said members, a shaft journaled in the other member and having a cam having circumferentially spaced curved surfaces of progressively increased radius engaging the sides of said slot to decrease or increase the distance between said gripping portions, depending on the direction of rotation of said shaft, the increment in radius of said curved surfaces being so slight that, when a workpiece is tightly clamped between said gripping portions, one of said curved surfaces will be in tight wedging engagement with the co-operating side of said slot.

29. A spline chuck comprising a body, axially spaced spline rings fixed to said body and having registering teeth, a relatively rotatable spline ring in the space between and on the same axis as said fixed spline rings and adapted to be rotated to bring its teeth into and out of register with said fixed teeth, a member coaxial with said rings, means for imparting axial movement to said member in each direction, means providing an axial lost motion connection between said member and said rotatable spline ring, means operative upon axial movement of said member to rotate said member, whereby, upon operation of the first-mentioned means to move said member in one direction, said rotatable spline ring will rotate to cause its teeth to move out of register with said fixed teeth and thereby cause each spline tooth of a workpiece positioned on said fixed teeth to be locked vise-fashion between a tooth of said rotatable spline ring on one side and fixed spline teeth on the other side, said first-mentioned means including resilient means operative to return said member to reregister said rotatable spline ring teeth with said fixed teeth, and means for preventing return of said member beyond the position at which all of said teeth are reregistered.

30. A spline chuck comprising a body, axially spaced spline rings fixed to said body and having registering teeth, a relatively rotatable spline ring in the space between and on the same axis as said fixed spline rings and adapted to be rotated to bring its teeth into and out of register with said fixed teeth, a member coaxial with said rings, means for imparting axial movement to said member in each direction, means providing an axial lost motion connection between said member and said rotatable spline ring, means operative upon axial movement of said member to rotate said member, whereby, upon operation of the first-mentioned means to move said member in one direction, said rotatable spline ring will rotate to cause its teeth to move out of register with said fixed teeth and thereby cause each spline tooth of a workpiece positioned on said fixed teeth to be locked vise-fashion between a tooth of said rotatable spline ring on one side and fixed spline teeth on the other side, said first-mentioned means including resilient means operative to return said member to reregister said rotatable spline ring teeth with said fixed teeth, means for preventing return of said member beyond the position at which all of said teeth are reregistered, said first-mentioned means including a ram coaxial with and engaging said member, and cam means engaging said ram and operative to shift said ram axially in said one direction.

31. A spline chuck comprising a body, axially spaced spline rings fixed to said body and having registering teeth, a relatively rotatable spline ring in the space between and on the same axis as said fixed spline rings and adapted to be rotated to bring its teeth into and out of register with said fixed teeth, a member coaxial with said rings, means for imparting axial movement to said member in each direction, means providing an axial lost motion connection between said member and said rotatable spline ring, and means operative upon axial movement of said member to rotate said member, whereby, upon operation of the first-mentioned means to move said member in one direction, said rotatable spline ring will rotate to cause its teeth to move out of register with said fixed teeth and thereby cause each spline tooth of a workpiece positioned on said fixed teeth to be locked vise-fashion between a tooth of said rotatable spline ring on one side and fixed spline teeth on the other side, said first-mentioned means comprising fluid pressure responsive means connected to said member and operative to shift said member axially selectively in each direction.

32. A spline chuck comprising a body, axially spaced spline rings fixed to said body and having registering teeth, a relatively rotatable spline ring in the space between and in the same axis as said fixed spline rings and adapted to be rotated to bring its teeth into and out of register with said fixed teeth, a member coaxial with said rings, means for imparting axial movement to said member in each direction, means providing an axial lost motion connection between said member and said rotatable spline ring, means operative upon axial movement of said member to rotate said member, whereby, upon operation of the first-mentioned means to move said member in one direction, said rotatable spline ring will rotate to cause its teeth to move out of register with said fixed teeth and thereby cause each spline tooth of a workpiece positioned on said fixed teeth to be locked vise-fashion between a tooth of said rotatable spline ring on one side and fixed spline teeth on the other side, said first-mentioned means comprising fluid pressure responsive means connected to said member and operative to shift said member axially selectively in each direction, and means positively stopping movement of said member in the other direction when all of said teeth are reregistered.

33. A spline chuck, comprising a body having a fixed pair of axially spaced sets of registered spline teeth, a set of spline teeth between and rotatably adjustable into and out of register with said fixed sets, a rotatably mounted cam member having a curved cam surface, means arranged between said rotatable set and said cam member for transmitting motion from said cam surface to said rotatable set in a direction to shift said rotatable set out of register with said fixed sets, whereby each spline tooth of a workpiece positioned on said fixed sets may be clamped vise-fashion by a tooth of said rotatable set on one side and teeth of said fixed sets on the other side, said means having a cam follower portion engaged by said cam surface, said cam surface being of progressively increased radius, the end of said cam surface of minimum radius being disposed adjacent said follower portion when all of said sets are in register, the increment in radius of said cam surface being slight so that, when the workpiece is tightly clamped, said cam surface is tightly wedged with said follower portion, and means operating pursuant to workpiece-releasing rotation of said cam member to return said rotatable set into register with said fixed sets.

34. A spline chuck, comprising a body having a fixed pair of axially spaced sets of registered spline teeth, and means cooperative with said fixed sets for chucking a spline-toothed workpiece, said means comprising a rotatable member including a set of spline teeth between and rotatably adjustable into and out of register with said fixed sets, whereby each spline tooth of the workpiece positioned on said fixed sets may be clamped vise-fashion by a tooth of said rotatable set on one side and teeth of said fixed sets on the other side, said means comprising another member, said members having interengaged cam portions arranged so that relative movement between said members pursuant to actuation of one of said members in one direction will produce rotation of said rotatable set out of register with said fixed sets into clamping engagement with the workpiece.

35. A spline chuck, comprising a body having a fixed pair of axially spaced sets of registered spline teeth, means cooperative with said fixed sets for chucking a spline-toothed workpiece, said means comprising a rotatable member including a set of spline teeth between and rotatably adjustable into and out of register with said fixed sets, whereby each spline tooth of the workpiece positioned on said fixed sets may be clamped vise-fashion by a tooth of said rotatable set on one side and teeth of said fixed sets on the other side, said means also comprising another member, said members having interengaged cam portions arranged so that relative movement between said members pursuant to actuation of one of said members in one direction will produce rotation of said rotatable set out of register with said fixed sets into clamping engagement with the workpiece, and means operating pursuant to actuation of said one member in the workpiece-releasing direction to stop return rotation of said rotatable set when the latter set is in register with said fixed sets.

36. A spline chuck, comprising a body having a fixed pair of axially spaced sets of registered spline teeth, means cooperative with said fixed sets for chucking a spline-toothed workpiece, said means including a rotatable member having a set of spline teeth between and rotatably adjustable into and out of register with said fixed sets, whereby each spline tooth of the workpiece positioned on said fixed sets may be clamped vise-fashion by a tooth of said rotatable set on one side and teeth of said fixed sets on the other side, said means also including another member, said members having interengaged cam surfaces, one of said surfaces being curved and tangent to the other surface, said surfaces being arranged so that relative movement between said members pursuant to actuation of one of said members in one direction will produce rotation of said rotatable set out of register with said fixed sets into clamping engagement with the workpiece.

ARTHUR MACKMANN.

REFERENCES CITED

The following references are of record in the file of this patent:

UNITED STATES PATENTS

| Number | Name | Date |
|---|---|---|
| 311,396 | Westbrook | Jan. 27, 1885 |
| 859,866 | Atkins | July 9, 1907 |
| 1,128,524 | Royce | Feb. 16, 1915 |
| 1,725,342 | Copland | Aug. 20, 1929 |
| 2,018,088 | Poock et al. | Oct. 22, 1935 |
| 2,045,156 | Matchett | June 23, 1936 |
| 2,372,931 | Bregin | Apr. 3, 1945 |
| 2,403,768 | Stoner | July 9, 1946 |

FOREIGN PATENTS

| Number | Country | Date |
|---|---|---|
| 464,875 | Great Britain | Apr. 27, 1937 |